United States Patent
Hirao et al.

(10) Patent No.: US 9,550,861 B2
(45) Date of Patent: Jan. 24, 2017

(54) METHOD FOR PRODUCING POLYANILINE HAVING SELF-DOPING FUNCTION AND ANTISTATIC AGENT CONTAINING POLYANILINE PRODUCED THEREBY

(71) Applicants: OSAKA UNIVERSITY, Osaka (JP); DAIHACHI CHEMICAL INDUSTRY CO., LTD., Osaka (JP)

(72) Inventors: Toshikazu Hirao, Osaka (JP); Toru Amaya, Osaka (JP); Yasushi Abe, Osaka (JP)

(73) Assignees: OSAKA UNIVERSITY, Osaka (JP); DAIHACHI CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/782,892

(22) PCT Filed: Apr. 4, 2014

(86) PCT No.: PCT/JP2014/001971
§ 371 (c)(1),
(2) Date: Oct. 7, 2015

(87) PCT Pub. No.: WO2014/167818
PCT Pub. Date: Oct. 16, 2014

(65) Prior Publication Data
US 2016/0046767 A1 Feb. 18, 2016

(30) Foreign Application Priority Data

Apr. 12, 2013 (JP) .................. 2013-084037

(51) Int. Cl.
C08G 73/02 (2006.01)
C09K 3/16 (2006.01)
C08L 79/02 (2006.01)
C09D 5/24 (2006.01)

(52) U.S. Cl.
CPC .......... *C08G 73/0266* (2013.01); *C08L 79/02* (2013.01); *C09D 5/24* (2013.01); *C09K 3/16* (2013.01)

(58) Field of Classification Search
CPC ............. C09K 3/16; C09D 5/24; C08L 79/02; C08G 73/0266
USPC ....................................... 528/168, 399, 422
See application file for complete search history.

(56) References Cited

FOREIGN PATENT DOCUMENTS

| JP | 9-62008 | 3/1997 |
| JP | 2000-191774 | 7/2000 |
| JP | 2003-192786 | 7/2003 |
| JP | 2004-99673 | 4/2004 |
| JP | 2008-33203 | 2/2008 |
| JP | 2011-501379 | 1/2011 |

OTHER PUBLICATIONS

Yano et al., Electropolymerization mechanism of highly conductive polyanilines and the unit molecular structure determined from a coulometric analysis of the electropolymerization, Bunseki Kagaku vol. 46, No. 5, pp. 343-349, 1997.
J. Stejekal et al., "Polyaniline nanostructures and the role of aniline oligomers in their formation," Progress in Polymer Science 35, 2010, pp. 1420-1481.
Mukai et al., Experimental Condition of the Synthesis of Acetoanilide and Its Relationship to Analine Black, The Hiyoshi review of the natural science, No. 50, 2011, pp. 61-75.
Hino et al., "Synthesis of Novel Functionalized Polyanilines and the Evaluation of its Ability for a Latent Catalyst," Bulletin Yamagata University (engineering), vol. 29, No. 2, Feb. 2007.
Hirao, et al., "Palladium-Catalyzed New Carbon-Phosphorus Bond Formation", Bulletin of the Chemical Society of Japan, vol. 55, pp. 909-913, 1982.
Belabassi, "Revisiting the Hirao Cross-coupling", Journal of Organometallic Chemistry, 693(19), Jan. 15, 2008, pp. 3171-3178.
Kohler, et al., "Development of a room temperature Hirao reaction", Tetrahedron Letters 50, 2009, pp. 457-459.
Hirao, et al., "A Novel Synthesis of Dialkyl Arenephosphonates", Synthesis, vol. 1, pp. 56-57, 1981, Stuttgart, New York.
International Search Report dated Jun. 24, 2014 in Application No. PCT/JP2014/001971.
Laska et al., "Water soluble polyaniline," Synthetic Metals, 2003, vol. 135-136, pp. 261-262.
Laska et al., "One-step polymerization leading to conducting polyaniline," Synthetic Metals, 2003, vol. 135-136, pp. 263-264.
Kalek et al., "Microwave-Assisted Palladium-Catalyzed Cross-Coupling of Aryl and Vinyl Halides with H-Phosphonate Diesters," Organic Letters, 2008 (received date), vol. 10, No. 20, pp. 4637-4640.
Chan et al., "A New Water-Soluble, Self-Doping Conducting Polyaniline from Poly (o-aminobenzylphosphonic acid) and It's Sodium Salts: Synthesis and Characterization," Journal of the American Chemical Society, 1995 (received date), vol. 117, No. 33, pp. 8517-8523.

*Primary Examiner* — Edward Cain
(74) *Attorney, Agent, or Firm* — Snell & Wilmer L.L.P.

(57) ABSTRACT

An aniline monomer having a phosphonic acid of general formula (4) is polymerized to produce a polyaniline. In the formula, $R^1$ is $NH_2$ or $NH_3X$, and X is a halogen. $R^2$ are each independently a phosphonic acid or a salt thereof. $R^3$ are each independently selected from the group consisting of a halogen atom, alkyl group having 1-15 carbon atoms, aralkyl group having 7-34 carbon atoms, alkoxy group having 1-15 carbon atoms, alkylthio group having 1-15 carbon atoms, alkylamino group having 1-15 carbon atoms, carboxyl group, carboxylic acid alkyl ester group wherein the alkyl group has 1-15 carbon atoms, nitro group, and cyano group. m is an integer of 1-4, n is an integer of 0-3, and the sum of m and n is 1-4. However, none of $R^2$ and $R^3$ is present at the para position relative to $R^1$.

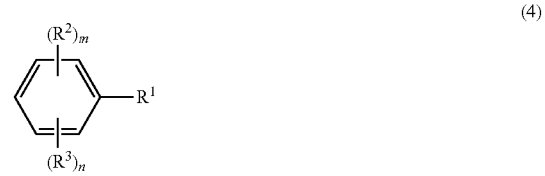

(4)

16 Claims, 20 Drawing Sheets

METHOD FOR PRODUCING POLYANILINE HAVING SELF-DOPING FUNCTION AND ANTISTATIC AGENT CONTAINING POLYANILINE PRODUCED THEREBY

CROSS-REFERENCE TO RELATED APPLICATIONS

This application is a U.S. national phase filing under 35 U.S.C. §371 of PCT/JP2014/001971 filed Apr. 4, 2014. PCT/JP2014/001971 claims priority from Japanese Application No. 2013-084037 which was filed on Apr. 12, 2013. Both of the aforementioned applications are incorporated herein by reference in their entirety.

TECHNICAL FIELD

The present invention relates to a method for producing conductive polyaniline and uses thereof. According to the producing method of the present invention, conductive polyaniline having a self-doping function is obtained. The conductive polyaniline obtained by the producing method according to the present invention is useful for a variety of uses, such as antistatic agents, static preventing agents, electrode material for plastic electrodes, EMI material, organic ferromagnets, and various sensors.

BACKGROUND ART

Electrically conductive polymers represented by polythiophene, polypyrrole, polyaniline and the like are a group of compounds that have been actively developed in the field of "organic electronics" recently. In the subject field, substances having conductivity in the range from about $10^{-2}$ to about $10^{-6}$ S/m are generally used as antistatic agents, static removing agent and the like.

Among such electrically conductive polymers, particularly, a polyaniline is obtainable from inexpensive raw materials, and a polyaniline is one of the first electrically conductive polymers that are in practical use. Thus, polyaniline that does not have any substituents is used as electrically conductive material. In order to cause polyaniline that does not have any substituents to achieve conductivity, however, it is necessary to perform doping (also referred to as dope) treatment with an acceptor or a donor with proton, iodine or the like, and such polyaniline itself that does not have any substituents does not have conductivity. Moreover, polyaniline that does not have any substituents is generally insoluble in solvents, and it is thus difficult to be shaped into a desired form, thus having a problem of poor workability.

In order to solve such a problem of a polyaniline that does not have any substituents, polyanilines, which are obtained by introducing a long chain alkyl group, ketone group, ether group or the like into polyaniline, with improved solubility against organic solvents have been reported. In the present specification, unless otherwise stated, the term "polyaniline" refers to both those that do not have any substituents and those that have substituents.

In addition, with regard to productivity, cost and the like in producing and shape processing of polyaniline, it is desirable for polyaniline to be water soluble. Thus, polyanilines with given water solubility have been recently developed by introducing an acidic substituent having proton into polyaniline. Furthermore, with regard to such polyaniline to which an acidic substituent is introduced, when the acidic substituent is introduced, the proton of the acidic substituent is doped. Thus, there is an advantage of obtaining conductivity without the need of performing a doping process separately (which is referred to as self-dope or self-doping). With regard to the acidic substituent herein, those in which a sulfo group ($—S(O)_2OH$) or phosphonic acid group ($—P(O)(OH)_2$) is used are known. Some of them are developed or expected in the use for prevention of static charge due to their conductivity.

As to polyaniline to which a sulfo group is introduced, "those obtained by sulfonating unsubstituted polyaniline with fuming sulfuric acid or chlorosulfuric acid" (Patent Document 1) and "those obtained by polymerizing aniline-sulfonic acids" (Patent Document 2) are known. In the method of performing sulfonation as described in Patent Document 1, a greatly excess amount of sulfonation agents are used for polyaniline to perform sulfonation, and a large amount of acidic waste is produced, resulting in a problem of difficulty in the disposal thereof. The method using aniline-sulfonic acids as described in Patent Document 2 has a problem of high product cost due to the high price of the raw material.

With regard to polyaniline having a phosphonic acid group, a method of polymerizing o-aminobenzylphosphonic acid to obtain poly(o-aminobenzylphosphonic acid) has been reported (Non-Patent Document 1). With this method, however, multiple stages of reaction are required to obtain a raw material that is used for polymerization. Specifically, a step of allowing o-bromomethyl-nitrobenzene (Br is present in Compound 1 in Scheme 1 on page 8518 of Non-Patent Document 1, and thus the description of "o-methylnitrobenzene 1" on page 8518, left column, 9th line from the bottom is a typographical error) to react with triethyl phosphite to obtain diethyl o-nitrobenzylphosphonate 2 (hereinafter, referred to as step 1); a step of reducing the diethyl o-nitrobenzylphosphonate 2 with cyclohexane to obtain diethyl o-aminobenzylphosphonate 3 (hereinafter, referred to as step 2); and a step of hydrolyzing the diethyl o-aminobenzylphosphonate 3 with concentrated hydrochloric acid to obtain o-aminobenzylphosphonic acid 4 (hereinafter, referred to as step 3) are performed to obtain a monomer that is used for polymerization. Furthermore, purification must be performed at each reaction, and thus there are many industrial problems to be solved from the viewpoint of productivity. In detail, it is necessary to perform reaction with 3 steps to obtain a raw material prior to polymerization, and including the polymerization, it is necessary to perform reaction of 4 steps. In Non-Patent Document 1, the yield and purification method of the respective steps are as follows: step 1: 64% (purification using column chromatography), step 2: 71% (purification using ion exchange), step 3: 65% (purification using recrystallization), and step 4 (polymerization): 30%.

As described above, various studies have been conducted for polyaniline; and with regard to the technique of allowing polyaniline to have an acidic substituent, sulfo groups are mainly studied as the acidic substituent. With regard to the technique of introducing a phosphonic acid group, those skilled in the art do not pay a lot of attention on it because the technique has some disadvantages such as complication of the producing steps, and no active studies have been conducted therefor. In particular, no studies have been conducted for the use of aniline monomers having a structure in which a phosphonic acid group is directly bound to a benzene ring.

Now, with regard to the mechanism of a polymerization reaction of aniline monomers as well as the structure of polyaniline, and the mechanism of expressing the conductivity, while there are some parts that have not been completely clarified, a variety of studies have been conducted and a variety of findings have been discovered.

For example, Yano et al., BUNSEKI KAGAKU Vol. 46, No. 5, pp. 343-349 (Non-Patent Document 2), Japanese Laid-Open Publication No. 2003-192786 (Patent Document 3), J. Stejekal et al., Progress in Polymer Science 35 (2010) 1420-1481 (Non-Patent Document 3) and Mukai et al., Keio University Hiyoshi Kiyou, Shizen Kagaku (The Hiyoshi review of the natural science), No. 50 (2011.9), p. 61-75 (Non-Patent Document 4), describe the mechanism of a polymerization reaction of aniline monomers.

Furthermore, Hino et al., Yamagata University Kiyou (engineering), Vol. 29, No. 2, February, Heisei-19 (Non-Patent Document 5) describes the mechanism of an oxidative polymerization of polyaniline and the structure of polyaniline obtained by an oxidative polymerization. Specifically, it is described that: a structure with conductivity referred to as an emeraldine salt is formed by an oxidative polymerization, and when the emeraldine salt is treated in an alkaline solution, an insulating structure referred to as emeraldine base is formed; when the emeraldine base is reduced, a structure referred to as leucoemeraldine is formed; and when the emeraldine base is oxidized, a structure referred to as pernigraniline is formed.

It is a well-known fact that polyaniline takes such four types of structures; and for example, Japanese Laid-Open Publication No. 2004-99673 (Patent Document 4), Japanese Laid-Open Publication No. 2008-33203 (Patent Document 5), and Japanese National Phase PCT Laid-open Publication No. 2011-501379 (Patent Document 6) describe the above-mentioned four types of structures.

It should be noted that while reactions in which phosphite is caused to bind with a benzene ring in the presence of a catalyst such as a palladium compound are publicly known (Non-Patent Documents 6 to 10), such reactions are solely studied for the purpose of developing a method for introducing a substituent into a benzene ring, and these reactions have not been known to be used for synthesis of polymers.

CITATION LIST

Patent Document

[Patent Document 1] Japanese Laid-Open Publication No. 2000-191774
[Patent Document 2] Japanese Laid-Open Publication No. 9-62008
[Patent Document 3] Japanese Laid-Open Publication No. 2003-192786
[Patent Document 4] Japanese Laid-Open Publication No. 2004-99673
[Patent Document 5] Japanese Laid-Open Publication No. 2008-33203
[Patent Document 6] Japanese National Phase PCT Laid-open Publication No. 2011-501379

Non-Patent Document

[Non-Patent Document 1] Chan et al, Journal of the American Chemical Society, 117, 8517 (1995)
[Non-Patent Document 2] Yano et al., BUNSEKI KAGAKU Vol. 46, No. 5, pp. 343-349
[Non-Patent Document 3] J. Stejekal et al., Progress in Polymer Science 35 (2010) 1420-1481
[Non-Patent Document 4] Mukai et al., Keio Gijuku Daigaku Hiyoshi Kiyou, Shizen Kagaku (The Hiyoshi review of the natural science), No. 50 (2011. 9), p. 61-75
[Non-Patent Document 5] Hino et al., Yamagata University Kiyou (engineering), Vol. 29, No. 2, February, Heisei-19
[Non-Patent Document 6] "Palladium-Catalyzed New Carbon-Phosphorus Bond Formation", Bulletin of the Chemical Society Of Japan, 55, 909-913 (1982)
[Non-Patent Document 7] "Microwave-Assisted Palladium-Catalyzed Cross-Coupling of Aryl and Vinyl Halides with H-Phosphonate Diesters", Organic Letters 2008, Vol. 10, No. 20, 4637-4640
[Non-Patent Document 8] "Development of a room temperature Hirao reaction", Tetrahedron Letters 50 (2009) 457-459
[Non-Patent Document 9] "A Novel Synthesis of Dialkyl Arenephosphonates", Toshikazu Hirao, Toshio Masunaga, Yoshiki Ohshiro and Toshio Agawa, Synthesis, (1), 56-57 (1981).
[Non-Patent Document 10] "Revisiting the Hirao Cross-coupling", Journal of Organometallic Chemistry, 693 (2008) 3171-3178.

SUMMARY OF INVENTION

Problems to be Solved by the Invention

As described above, the polyaniline that has been conventionally developed as those having a self-doping function are not considered fully satisfactory from the viewpoint of the productivity and cost, and the development of novel products having further improved performance has been desired. The problem to be solved by the present invention lies in the provision of a method for producing polyaniline having a phosphoric acid group having a self-doping function in an extremely easier way and in a much higher yield compared to conventional methods, and in the provision of an antistatic agent which uses the subject polyaniline.

Means for Solving the Problem

The inventors of the present application eagerly conducted studies and as a result, the above-mentioned problems were found to be solved by polymerizing an aniline monomer compound having a certain structure of phosphonic acid or a monomer mixture comprising such a monomer to produce polyaniline, thereby completing the present invention.

Specifically, the present invention provides the following methods and the like.

(Item 1)

A method for producing a polyaniline, comprising a step of polymerizing an aniline monomer compound represented by the following general formula (4):

[Chemical Formula 1]

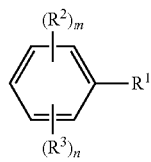

(4)

(wherein $R^1$ is $NH_2$ or $NH_3X$, and X is a halogen atom; $R^2$ is each independently a substituent represented by the following general formula (5):

[Chemical Formula 2]

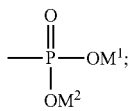
(5)

$M^1$ and $M^2$ are each independently selected from the group consisting of a hydrogen atom, alkali metal, alkaline earth metal, ammonium group, and pyridinium group, with the proviso that when $M^1$ or $M^2$ is an alkaline earth metal, the structure is such that the alkaline earth metal atom is bound to two $O^-$ in one phosphonic acid group and $M^2$ is not present, or such that the alkaline earth metal atom cross links $O^-$ of two phosphonic acid groups;
$R^3$ is each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15 carbon atoms, carboxyl group, carboxylic acid alkyl ester group in which the number of carbon atoms of the alkyl group is 1 to 15, nitro group and cyano group;
m is an integer of 1 to 4;
n is an integer of 0 to 3; and
the sum of m and n is 1 to 4;
with the proviso that neither $R^2$ nor $R^3$ is present at the para position relative to $R^1$); or
an aniline monomer mixture comprising the aniline monomer compound.
(Item 2)
The method according to above described Item 1, wherein at least one of $M^1$ and $M^2$ is a hydrogen atom.
(Item 3)
The method according to above described Item 1 or 2, wherein the polymerizing step is performed in the presence of 0.5 to 10 equivalents of an oxidizing agent with respect to the aniline monomer compound or the aniline monomer mixture.
(Item 4)
The method according to any one of above described Items 1 to 3, wherein the polymerizing step is performed in the presence of a solvent.
(Item 5)
The method according to above described Item 4, wherein the solvent is at least one selected from ammonia water, pyridine water, pyridine, triethylamine water, triethylamine, water, hydrochloric acid, methanol, ethanol, isopropanol, acetonitrile, dimethylformamide, acetone, 2-butanone and dimethylacetamide.
(Item 6)
The method according to any one of above described Items 1 to 5, further comprising a step of synthesizing an aniline monomer compound represented by general formula (4), wherein the synthesizing step comprises:
binding a dialkyl phosphite represented by general formula (7):

[Chemical Formula 4]

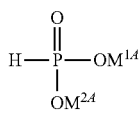
(7)

(wherein $M^{1A}$ and $M^{2A}$ are each independently an alkyl group in which the number of carbon atoms is 1 to 15) to a compound represented by the following general formula (6):

[Chemical Formula 3]

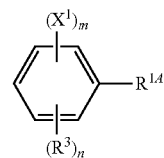
(6)

(wherein $R^{1A}$ is a nitro group or an amino group, and $X^1$ is each independently a halogen atom;
definitions of $R^3$, m and n are the same as the definitions of $R^3$, m and n in item 1;
with the proviso that neither $X^1$ nor $R^3$ is present in the para position relative to $R^{1A}$).
(Item 7)
The method according to any one of above described Items 1 to 5, further comprising a step of synthesizing an aniline monomer compound represented by general formula (4), wherein the synthesizing step comprises nitrating a compound represented by the following general formula (8):

[Chemical Formula 5]

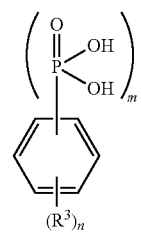
(8)

(wherein definitions of $R^3$, m and n are the same as the definitions of $R^3$, m and n in above described Item 1, with the proviso that no substituent is present on the carbon at the para position relative to the carbon to be nitrated in the benzene ring).
(Item 8)
The method according to above described Item 6, wherein $R^{1A}$ is an amino group, and wherein the method further comprises hydrolyzing alkyl ester of $M^{1A}$ and $M^{2A}$ moieties of the compound obtained by binding the dialkyl phosphite to obtain an aniline monomer compound.
(Item 9)
The method according to above described Item 6, wherein $R^{1A}$ is a nitro group, and wherein the method further comprises reducing a nitro group of the compound, which is obtained by binding the dialkyl phosphite, to an amino group to obtain an amino compound, and hydrolyzing alkyl ester of $M^{1A}$ and $M^{2A}$ moieties of the obtained amino compound to obtain an aniline monomer compound.
(Item 10)
The method according to above described Item 7, further comprising a step of reducing the nitro group of the compound obtained by the nitration to obtain an aniline monomer compound.

(Item 11)

The method according to any one of above described Items 1 to 10, wherein a reaction temperature of the polymerizing step is in the range from −15° C. to 70° C.

(Item 12)

The method according to any one of above described Items 1 to 11, wherein m is 1, and n is 0 or 1.

(Item 13)

The method according to any one of above described Items 1 to 12, further comprising a step of performing an ion exchange treatment on the polymerization reaction product to replace a metal atom, an ammonium group or a pyridinium group of the phosphonic acid metal salt, phosphonic acid ammonium salt or phosphonic acid pyridinium salt in the polymerization reaction product, with a hydrogen atom.

(Item 14)

The method according to above described Item 13, wherein: the ion exchange treatment step is a step of adding an acidic aqueous solution to the polymerization reaction product to replace a salt moiety of the phosphonic acid salt compound with hydrogen; after the ion exchange treatment step, a step of separating a polyaniline compound from the aqueous solution is performed; and further, thereafter, a step of adding an acidic aqueous solution to replace a salt moiety of the phosphonic acid salt compound with hydrogen and a step of separating a polyaniline compound from the aqueous solution are repeatedly performed.

(Item 15)

A polyaniline produced by using the method according to any one of above described Items 1 to 14.

(Item 16)

An antistatic agent containing the polyaniline according to above described Item 15.

Effects of Invention

According to the producing method according to the present invention, polyaniline compounds of the following Embodiment 1 to Embodiment 4 or hydrates thereof, for example, are obtained.

Embodiment 1

A polyaniline compound, having a structure represented by a general formula (10):

$$[-A^1{}_g\text{-}A^2{}_h\text{-}A^3{}_j\text{-}A^4{}_k\text{-}] \quad (10)$$

or a hydrate thereof,
wherein
$A^1$ is represented by the following general formula (11):

[Chemical Formula 6]

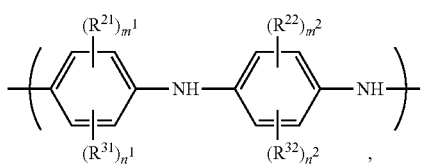

$A^2$ is represented by the following general formula (12):

[Chemical Formula 7]

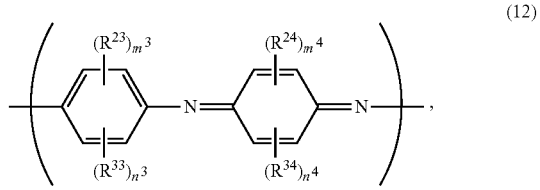

$A^3$ is represented by the following general formula (13):

[Chemical Formula 8]

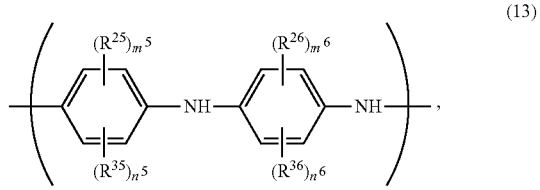

$A^4$ is represented by the following general formula (14):

[Chemical Formula 9]

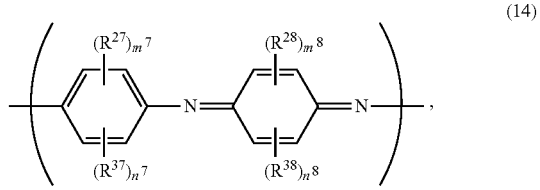

$R^{21}$ is a substituent represented by the following general formula (21):

[Chemical Formula 10]

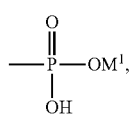

$R^{22}$ is a substituent represented by the following general formula (22):

[Chemical Formula 11]

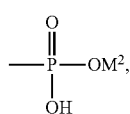

$R^{23}$ is a substituent represented by the following general formula (23):

[Chemical Formula 12]

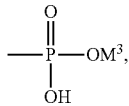
(23)

$R^{24}$ is a substituent represented by the following general formula (24):

[Chemical Formula 13]

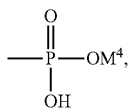
(24)

$R^{25}$ is a substituent represented by the following general formula (25):

[Chemical Formula 14]

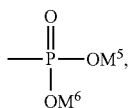
(25)

$R^{26}$ is a substituent represented by the following general formula (26):

[Chemical Formula 15]

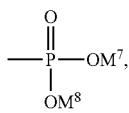
(26)

$R^{27}$ is a substituent represented by the following general formula (27):

[Chemical Formula 16]

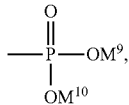
(27)

$R^{28}$ is a substituent represented by the following general formula (28):

[Chemical Formula 17]

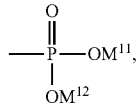
(28)

g is any integer greater than or equal to 1,
h is any integer greater than or equal to 0,
j is any integer greater than or equal to 0,
k is any integer greater than or equal to 0,
the sum of g and h is an integer greater than or equal to 10,
the sum of j and k is 50% or less of the sum total of g, h, j and k,
$M^1$ to $M^{12}$ are each independently selected from the group consisting of a hydrogen atom, alkali metal, alkaline earth metal, ammonium group, and pyridinium group, with the proviso that when at least one of $M^1$ to $M^{12}$ is an alkaline earth metal, the compound has a structure in which two of the $M^1$ to $M^{12}$ are in conjunction with each other to be each of the alkaline earth metal,
$R^{31}$ to $R^{38}$ are each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group,
$m^1$ to $m^8$ are each independently an integer of 1 to 4,
$n^1$ to $n^8$ are each independently an integer of 0 to 3,
the sum of $m^1$ and $n^1$ is 1 to 4,
the sum of $m^2$ and $n^2$ is 1 to 4,
the sum of $m^3$ and $n^3$ is 1 to 4,
the sum of $m^4$ and $n^4$ is 1 to 4,
the sum of $m^5$ and $n^5$ is 1 to 4,
the sum of $m^6$ and $n^6$ is 1 to 4,
the sum of $m^7$ and $n^7$ is 1 to 4, and
the sum of $m^8$ and $n^8$ is 1 to 4.

Embodiment 2

The polyaniline compound or a hydrate thereof in Embodiment 1 described above, wherein
$M^1$ to $M^4$ are the same,
$M^5$, $M^7$, $M^9$, $M^{11}$ are the same,
$M^6$, $M^8$, $M^{10}$, $M^{12}$ are the same,
$R^{21}$ to $R^{24}$ are the same,
$R^{25}$ to $R^{28}$ are the same,
$R^{31}$ to $R^{34}$ are the same,
$R^{35}$ to $R^{38}$ are the same,
$m^1$ to $m^4$ are the same,
$m^5$ to $m^8$ are the same,
$n^1$ to $n^4$ are the same, and
$n^5$ to $n^8$ are the same.

Embodiment 3

The polyaniline compound or a hydrate thereof in Embodiment 1 or 2 described above, wherein
h is greater than or equal to 10,
j is 0, and
k is 0.

Embodiment 4

The polyaniline compound or a hydrate thereof in any of Embodiments 1 to 3 described above, wherein
$M^1$ to $M^{12}$ are each a hydrogen atom,
$m^1$ to $m^8$ are each 1,
$n^1$ to $n^5$ are each 0 or 1, and
$R^{31}$ to $R^{38}$ are each an alkyl group in which the number of carbon atoms is 1 to 15 or an alkoxy group in which the number of carbon atoms is 1 to 15.

(Usefulness)

As described above, according to the present invention, a novel polyaniline having a phosphonic acid group and having a self-doping function can be obtained. Furthermore, according to the present invention, it becomes possible to produce polyaniline easier than conventional methods, and with a higher yield and with less cost than conventional methods. The polyaniline having the phosphonic acid group, obtained by the method according to the present invention, demonstrates high conductivity, and it is useful as an antistatic agent.

EMBODIMENTS FOR CARRYING OUT THE INVENTION

Figure 1:
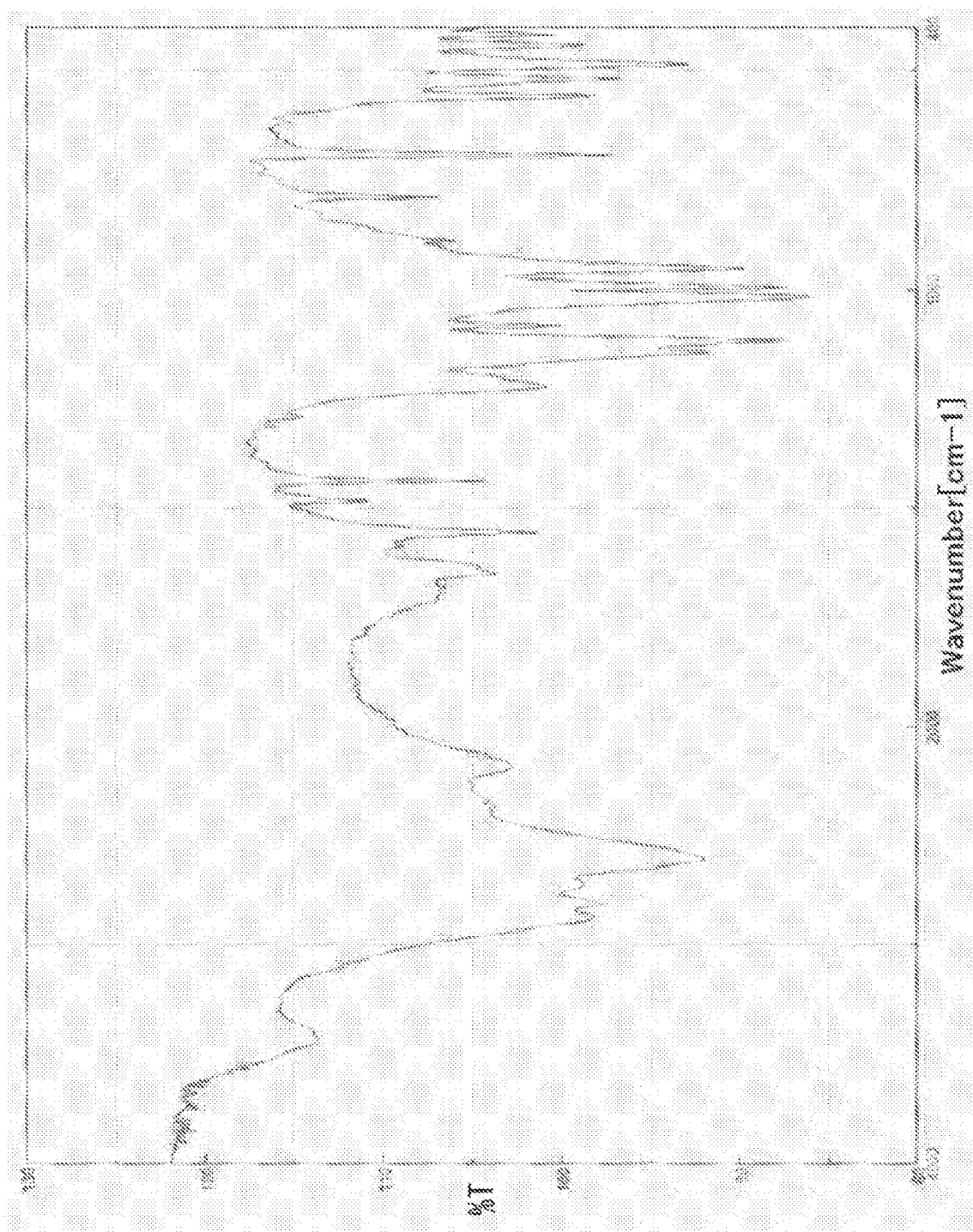
FIG. 1 shows a FT-IR spectrum (KBr method) of 3-aminophenylphosphonic acid.

Hereinafter, the present invention will be described in detail.

(Method for Producing Polyaniline)

With regard to the producing method according to the present invention, polyaniline is produced by polymerizing an aniline monomer compound having a phosphonic acid or an aniline monomer mixture comprising the monomer compound.

(Aniline Monomer)

In the present specification, "aniline monomer" or "aniline monomer compound" means a monomer with which a polymerization reaction for obtaining polyaniline from aniline can be performed. Specifically, it is an unsubstituted aniline ($C_6H_5NH_2$) or a substituted aniline or a salt thereof. The substituted aniline means those at least one of the benzene ring and amino group thereof has a substituent. In the benzene ring, assuming that the amino group is at position 1, substituents may be present at one to four positions selected from positions 2, 3, 5 and 6 (i.e., ortho position or meta position). However, a substituted aniline having a substituent at position 4 (para position) cannot be polymerized, and thus a substituted aniline in which position 4 (para position) is substituted is not included in the aniline monomer. The salt of unsubstituted or substituted aniline is a compound in which a moiety of an amino group has become a salt, where the moiety of the salt does not interfere with a polymerization reaction. An example of the unsubstituted or substituted aniline includes, for example, an ammonium salt.

In the present specification, "aniline monomer mixture" refers to a mixture in which two or more of aniline monomer compounds are mixed.

(Polyaniline)

In the present specification, polyaniline refers to a substance which is obtained by polymerizing an aniline monomer compound or an aniline monomer mixture. A polyaniline usually has a structure in which the amino group of an aniline monomer is bound to the para position of another aniline monomer.

A polyaniline can be allowed to have an arbitrary degree of polymerization. A polyaniline can be allowed to have a degree of polymerization of, for example, 4 or more, 10 or more, 50 or more, 100 or more or 200 or more. In addition, A polyaniline can be allowed to have a degree of polymerization of 2,000 or less, 1,500 or less, 1,000 or less, 800 or less, or 600 or less.

Similarly, a polyaniline can be allowed to have an arbitrary molecular weight.

A polyaniline can be allowed to have a number average molecular weight of, for example, 700 or more, 2,000 or more, 10,000 or more, 20,000 or more or 30,000 or more. In addition, a polyaniline can be allowed to have a number average molecular weight of 400,000 or less, 300,000 or less, 200,000 or less, 150,000 or less, or 100,000 or less.

A polyaniline can be allowed to have a weight average molecular weight of, for example, 1,400 or more, 4,000 or more, 20,000 or more, 40,000 or more, or 60,000 or more. In addition, a polyaniline can be allowed to have a weight average molecular weight of 800,000 or less, 600,000 or less, 400,000 or less, 300,000 or less, or 200,000 or less.

(Aminophenylphosphonic Acid or a Salt Thereof)

In the method for producing a polyaniline according to the present invention, the aminophenylphosphonic acid monomer represented by the following general formula (4) or an aniline monomer mixture comprising the monomer is used as a monomer that is a raw material in performing a polymerization.

[Chemical Formula 18]

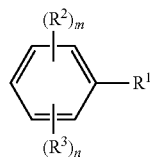

(4)

(wherein $R^1$ is $NH_2$ or $NH_3X$, X is a halogen atom, $R^2$ is each independently a substituent represented by the following general formula (5):

[Chemical Formula 19]

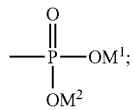

(5)

$M^1$ and $M^2$ are each independently selected from the group consisting of a hydrogen atom, alkali metal, alkaline earth metal, ammonium group, and pyridinium group, with the proviso that when $M^1$ or $M^2$ is an alkaline earth metal, the structure is such that the alkaline earth metal atom is bound to two $O^-$ in one phosphoric acid group and $M^2$ is not present, or such that the alkaline earth metal atom crosslinks $O^-$ of two phosphonic acid groups;

$R^3$ is each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group;

m is an integer of 1 to 4;
n is an integer of 0 to 3; and
the sum of m and n is 1 to 4;

with the proviso that neither $R^2$ nor $R^3$ is present at the para position relative to $R^1$).

In the general formula (5) described above, it is preferable that $M^1$ and $M^2$ are selected from a hydrogen atom, alkali metal and alkaline earth metal. However, it is preferable that at least one of $M^1$ and $M^2$ is a hydrogen atom. Due to self-doping in which the hydrogen atom works as a dopant, the polyaniline obtained by the producing method according to the present invention demonstrates conductivity.

In the present specification, "alkali metal" refers to any atom pertaining to group 1 of the periodic table. Specific examples of the alkali metal include lithium, sodium, potassium, rubidium, cesium, and the like.

In the present specification, "alkaline earth metal" refers to any atom pertaining to group 2 of the periodic table. Specific examples of the alkaline earth metal include beryllium, magnesium, calcium, strontium, barium, radium and the like.

With regard to the general formula (4) described above, $R^3$ is at least one selected from the group consisting of a halogen atom, alkyl group, aralkyl group, alkoxy group, alkylthio group, alkylamino group, carboxyl group, carboxylic acid alkyl ester group, nitro group and cyano group. Among them, electron-donating groups such as alkyl group, alkoxy group, alkylthio group and alkylamino group are preferable, and alkyl group and alkoxy group are particularly preferable.

Specific examples of the halogen atom include chlorine atom, fluorine atom, bromine atom and iodine atom, and chlorine atom and bromine atom are preferable.

It should be noted that in the present specification, "alkyl" refers to a monovalent group which is produced when one hydrogen atom is lost from a chain or cyclic aliphatic hydrocarbon (alkane). In the case of chain alkyl, it is generally represented by $C_kH_{2k+1}$— (wherein k is a positive integer). Chain alkyl may also be a linear or branched chain. Cyclic alkyl may be formed only of a cyclic structure, or may be a structure in which a chain alkyl is further bound to the cyclic structure. The number of carbons of alkyl may be any natural number. The number of carbons of alkyl is 1 to 30 in one embodiment, and is 1 to 20 in another embodiment.

In particular, with regard to the alkyl group in the general formula (4) described above, the number of carbon atoms of the alkyl group is preferably 1 to 15, more preferably 1 to 8, and particularly preferably 1 to 4. Specific examples of the alkyl group include a methyl group, ethyl group, propyl group, butyl group, pentyl group, hexyl group, heptyl group, octyl group, nonyl group, decyl group, undecyl group, dodecyl group, tridecyl group, tetradecyl group and pentadecyl group and the like.

In the present specification, "aralkyl group" refers to a structure in which one or some of hydrogen atoms of an alkyl group is substituted with an aryl group.

In the present specification, "aryl group" refers to a group which is produced when one of the hydrogen atoms bound to the ring of aromatic hydrocarbon is removed. The number of the ring of the aromatic hydrocarbon forming an aryl group may be one, or may be two or more. The number of the ring of the aromatic hydrocarbon forming an aryl group is preferably 1 to 3. When there are a plurality of aromatic hydrocarbon rings in a molecule, the plurality of rings may be condensed or may not be condensed. Specifically, for example, phenyl, naphthyl, anthracenyl, biphenyl and the like are included.

In particular, the alkyl group forming the aralkyl group in $R^3$ of the general formula (4) described above may be linear or may be branched, and preferably the number of carbons is 1 to 10, and more preferably the number of carbons is 1 to 5. The aryl group forming the aralkyl group is preferably an aryl group comprising 1 to 4 benzene rings which may have a substituent. For example, phenyl group, biphenyl group, terphenyl group, naphthyl group, anthryl group, phenanthryl group, pyrenyl group and fluorenyl group and the like, which may have 1 or 2 or more substituents, and a phenyl group, biphenyl group and naphthyl group are more preferable. The substituents include, for example, an alkyl group in which the number of carbon atoms is 1 to 3, phenyl group, phenylalkyl group in which the number of carbon atoms is 7 to 21, and alkoxy group in which the number of carbon atoms is 1 to 10, halogen atom, formyl group, acyl group, carboxyl group, cyano group, nitro group and sulfone group and the like.

The number of carbons of an overall aralkyl group is preferably 7 to 34, and is particularly preferably 7 to 15. Specific examples include a benzyl group, phenylethyl group, phenylpropyl group, phenylbutyl group, phenylpentyl group, naphthylmethyl group, naphthylethyl group, naphthylpropyl group, naphthylbutyl group, naphthylpentyl group, anthrylmethyl group, anthrylethyl group, anthrylpropyl group, anthrylbutyl group, anthrylpentyl group, biphenylmethyl group, biphenylethyl group, biphenylpropyl group, biphenylbutyl group and biphenylpentyl group and the like.

In the present specification, "alkoxy" refers to a group in which an oxygen atom is bound to the alkyl group described above. Specifically, when the alkyl group described above is represented by $R^4$—, it refers to a group that is represented by $R^4O$—. Chain alkoxy may be a linear chain or may be a branched chain. Cyclic alkoxy may be formed only of a cyclic structure, or may be a structure in which a chain alkyl is further bound to the cyclic structure. The number of carbons of alkoxy may be any natural integer. The number of carbons is 1 to 30 in one embodiment, and the number of carbons is 1 to 20 in another embodiment.

Above all, with regard to the alkoxy group in $R^3$ of the general formula (4) described above, the alkyl group moiety may be linear or may be branched, and the number of carbon atoms is preferably 1 to 15, more preferably 1 to 8, and particularly preferably 1 to 4. Specific examples include methoxy group, ethoxy group, propoxy group, butoxy group, pentyloxy group, hexyloxy group, heptyloxy group, octyloxy group, nonyloxy group, decyloxy group, undecyloxy group, dodecyloxy group, tridecyloxy group, tetradecyloxy group, pentadecyloxy group and the like.

In the present specification, "alkylthio" refers to a group in which a sulfur atom is bound to the alkyl group described above. Specifically, when the alkyl group described above is represented by $R^4$—, it is a group represented by $R^4S$—. Chain alkylthio may be a linear chain or may be a branched chain. Cyclic alkylthio may be formed only of a cyclic structure, or may be a structure in which a chain alkyl is further bound to the cyclic structure. The number of carbons of alkylthio may be any natural integer. The number of carbons is 1 to 30 in one embodiment, and the number of carbons is 1 to 20 in another embodiment.

With regard to the alkylthio group in $R^3$ of the general formula (4) described above, the alkyl group moiety may be linear or may be branched, and the number of carbon atoms is preferably 1 to 15, more preferably 1 to 8, and particularly preferably 1 to 4. Specific examples include methylthio group, ethylthio group, propylthio group, butylthio group, pentylthip group, hexylthio group, heptylthio group, octylthio group, nonylthio group, decylthio group, undecylthio group, dodecylthio group, tridecylthio group, tetradecylthio group, pentadecylthio group and the like.

In the present specification, "alkylamino" refers to a group in which an amino group is bound to an alkyl group described above. Specifically, when the alkyl group described above is represented by $R^4$—, it refers to a group represented by $R^4NH$—. Chain alkylamino may be a linear chain or may be a branched chain. Cyclic alkylamino may be formed only of a cyclic structure, or may be a structure in which a chain alkyl is further bound to the cyclic structure. The number of carbon of alkylamino may be any natural integer. The number of carbon is 1 to 30 in one embodiment, and the number of carbon is 1 to 20 in another embodiment.

With regard to the alkylamino group in $R^3$ of the general formula (4) described above, the alkyl group moiety may be linear or may be branched, and the number of carbon atoms is preferably 1 to 15, more preferably 1 to 8, and particularly preferably 1 to 4. Specific examples include methylamino group, ethylamino group, propylamino group, butylamino group, pentylamino group, hexylamino group, heptylamino group, octylamino group, nonylamino group, decylamino group, undecylamino group, dodecylamino group, tridecylamino group, tetradecylamino group, pentadecylamino group and the like.

In the present specification, "carboxylic acid alkyl ester" refers to a group in which a carboxylic acid group is bound to the alkyl group described above. Specifically, when the alkyl group described above is represented by $R^4$—, it refers to a group represented by —$COOR^4$. Chain carboxylic acid alkyl ester may be a linear chain or may be a branched chain. Cyclic carboxylic acid alkyl ester may be formed only of a cyclic structure, or may be a structure in which a chain alkyl is further bound to the cyclic structure. The number of carbons of the carboxylic acid alkyl ester may be any natural number. The number of carbons is 1 to 30 in one embodiment, and the number of carbons is 1 to 20 in another embodiment.

With regard to the carboxylic acid alkyl ester group in $R^3$ of the general formula (4) described above, the carbon atom of the carboxylic acid thereof is bound to the benzene ring of the general formula (4). Specifically, when the benzene ring is described as Ph, it becomes the structure of Ph-C(=O)—$OR^4$. As to the subject carboxylic acid alkyl ester group, the number of carbon atoms of the alkyl group is preferably 1 to 15, more preferably 1 to 8, and particularly preferably 1 to 4. Specific examples include a carboxylic acid methyl group, carboxylic acid ethyl group, carboxylic acid propyl group, carboxylic acid butyl group, carboxylic acid pentyl group, carboxylic acid hexyl group, carboxylic acid heptyl group, carboxylic acid octyl group, carboxylic acid nonyl group, carboxylic acid decyl group, carboxylic acid undecyl group, carboxylic acid dodecyl group, carboxylic acid tridecyl group, carboxylic acid tetradecyl group, carboxylic acid pentadecyl group and the like.

In the general formula (4), m is an integer of 1 to 4, preferably an integer of 1 to 3, more preferably an integer of 1 to 2. n is an integer of 0 to 3, preferably an integer of 0 to 2, and more preferably an integer of 0 to 1. When the number of m and n are smaller, the aminophenylphosphonic acid, which is a raw material of the method for producing polyaniline according to the present invention, can be produced less expensively and more easily.

In addition, a compound in which $R^1$ in the general formula (4) is represented by $NH_3X$, that is, a salt of an aminophenylphosphonic acid, is also usable as an aniline monomer, which is a raw material for the method for producing a polyaniline according to the present invention.
(Method for Producing an Aminophenylphosphonic Acid Monomer)

An aminophenylphosphonic acid monomer can be produced using any of conventionally and publicly known methods.

In consideration of yield and operability, for example, the following Monomer Production Embodiments 1 to 3 are preferable for a method for producing an aminophenylphosphonic acid monomer.

Monomer Production Embodiment 1

When halogenated aniline is used as a starting material in producing a monomer, a dialkyl phosphite is bound to the halogenated aniline, and then an alkyl group is hydrolyzed, and thereby it is possible to obtain an aminophenylphosphonic acid (Scheme 1).

<Scheme 1>

[Chemical Formula 20]

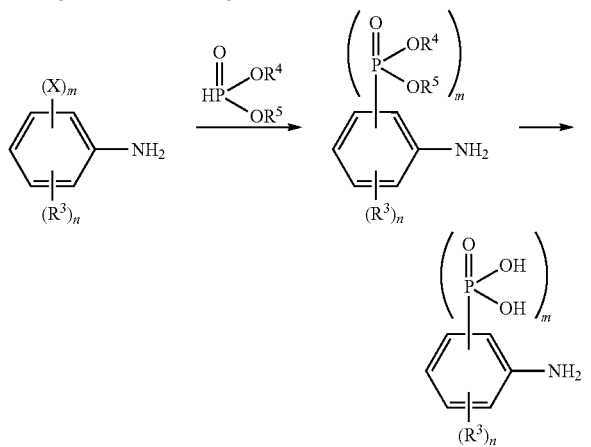

wherein, $R^3$ is each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group,
m is an integer of 1 to 4,
n is an integer of 0 to 3,
the sum of m and n is 1 to 4,
X is halogen, and
$R^4$ and $R^5$ are each an alkyl group. The number of carbon of each of $R^4$ and $R^5$ is preferably 1 to 15, more preferably 1 to 8, and particularly preferably 1 to 4. However, no substituents are present at the para position relative to the amino group.

A method called Hirao reaction, for example, is publicly known as a method for binding a dialkyl phosphite to a halogenated aniline.

It should be note that in the present specification, "Hirao reaction" refers to a reaction for binding a phosphite to a benzene ring in the presence of a catalyst such as a palladium compound. The Hirao reaction is specifically described in the following documents.
(1) "Palladium-Catalyzed New Carbon-Phosphorus Bond Formation", Bulletin of the Chemical Society Of Japan, 55, 909-913 (1982) (Non-Patent Document 6 described above)
(2) "Microwave-Assisted Palladium-Catalyzed Cross-Coupling of Aryl and Vinyl Halides with H-Phosphonate Diesters", Organic Letters 2008, Vol. 10, No. 20, 4637-4640 (Non-Patent Document 7 described above)
(3) "Development of a room temperature Hirao reaction", Tetrahedron Letters 50 (2009) 457-459 (Non-Patent Document 8 described above)
(4) "A Novel Synthesis of Dialkyl Arenephosphonates", Toshikazu Hirao, Toshio Masunaga, Yoshiki Ohshiro and Toshio Agawa, Synthesis, (1), 56-57 (1981). (Non-Patent Document 9 described above)
(5) "Revisiting the Hirao Cross-coupling", Journal of Organometallic Chemistry, 693 (2008) 3171-3178. (Non-Patent Document 10 described above)

With regard to a catalyst used for Hirao reaction, any publicly known catalysts as described in the documents described above can be used. The catalyst is preferably a palladium compound, and more preferably Pd(PPh$_3$)$_4$ or Pd(OAc)$_2$.

According to Monomer Production Embodiment 1 described above, it is possible to obtain the monomer substantially with the two steps described above only, and an aniline monomer compound can be obtained with a relatively high yield without many steps to be required.

Monomer Production Embodiment 2

When a substituted or unsubstituted phenylphosphonic acid, for example, is used as a raw material in producing a monomer, nitration is performed with nitric acid, and then the nitro group is reduced with hydrogen to form an amino group, and thereby it is possible to obtain an aminophenylphosphonic acid (Scheme 2).

<Scheme 2>

[Chemical Formula 21]

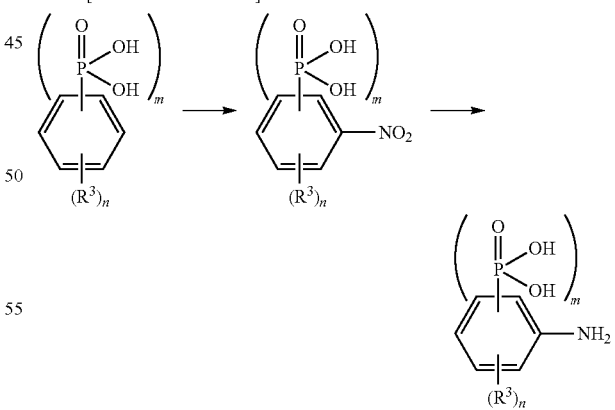

wherein the definitions of $R^3$, m and n are the same as the definitions in Scheme 1 described above. However, no substituents are present at the carbon of the para position relative to the carbon which is nitrated in the benzene ring in the starting compound of Scheme 2. Specifically, when the sum of m and n is 4, the two carbons in the benzene ring having no substituent are in the para positional relationship with each other. When the sum of m and n is 3, two carbons among the three carbons in the benzene ring having no substituent are in the para positional relationship with each other. Thus, in the intermediate of Scheme 2, no substituents are present at the para position of the nitro group. Furthermore, no substituents are present at the para position of the amino group in the aminophenylphosphonic acid compound, which is the final product of Scheme 2.

In the case of a nitration reaction of a benzene ring that is generally performed (such as nitration reaction with nitric acid and sulfuric acid), in the starting compound of Scheme 2, the meta position relative to the phosphonic acid group tends to be nitrated. Thus, as to the intermediate compound of Scheme 2, compounds, in which the meta position relative to the phosphonic acid group is not nitrated and in which no phosphonic acid group is present at the para position relative to the nitro group, are obtained with a high yield.

In addition, the position of the $R^3$ group, is selected, not to be the para position relative to the position to which the nitro group is bound, that is, the position of the $R^3$ group is selected to be an ortho or meta position. When there is one phosphonic acid group present in the benzene ring of the starting compound of Scheme 2, and assuming that the position of the phosphonic acid group of the benzene ring is position 1, the meta position (i.e., position 3 or 5) tends to be nitrated as described above. In such a case, the position of the $R^3$ group is selected at zero to three positions among the three positions of positions 2, 4 and 5, or at zero to three positions among the three positions of positions 3, 4 and 6, so that the $R^3$ group will not be present at the para position (position 6 or 2) relative to the position 3 or 5 at which carbon tends to be nitrated. Thus, the position of the $R^3$ group is selected such that the $R^3$ group will not be present at least at one of the two positions (positions 2 and 6), which are in the ortho positional relationship relative to the phosphonic acid group.

When there are two phosphonic acid groups in the benzene ring of the starting compound of Scheme 2, the relationship of the two phosphonic acid groups may be ortho, meta or para. The relationship is preferably meta. In the case that the relationship of the two phosphonic acid groups is ortho, assuming that the positions of the two phosphonic acid groups are position 1 and position 2, then position 3 or position 6 is nitrated, no substituents are present at position 6 or position 3, and either the $R^3$ group is not present or the position of the $R^3$ group is selected from position 4 and position 5. In the case that the relationship of the two phosphonic acid groups is meta, assuming that the positions of the two phosphonic acid groups are position 1 and position 3, then position 2 or position 5 is nitrated, no substituents are present at position 5 or position 2, and either the $R^3$ group is not present or the position of the $R^3$ group is selected from position 4 and position 6. In the case that the relationship of the two phosphonic acid groups is para, assuming that the positions of the two phosphonic acid groups are position 1 and position 4, then position 2, position 3, position 5 or position 6 is nitrated, no substituents are present at position 5, position 6, position 2 or position 3, and either the $R^3$ group is not present or the position of the $R^3$ group is selected from position 2, position 3, position 5 and position 6 excluding the position of the nitro group and the para position relative thereto.

In the case that there are three phosphonic acid groups present in the benzene ring of the starting compound of Scheme 2, assuming that the position of one of them is position 1, the positions of the three phosphonic acid groups are position 1, position 2 and position 4 (or position 1, position 2 and position 5, or position 1, position 3 and position 4). In the case that the phosphonic acid groups are present at position 1, position 2 and position 4, then position 3 or position 6 is nitrated and no substituents are present at position 6 or position 3, and either the $R^3$ group is not present or the position of the $R^3$ group is position 5. In the case that the positions of the three phosphonic acid groups are position 1, position 2 and position 3, or position 1, position 3 and position 5, or the like, there is a phosphonic acid group present at the para position relative to the introduced nitro group, and therefore it is not appropriate.

In the case that there are four phosphonic acid groups in the benzene ring of the starting compound of Scheme 2, assuming that the position of one of them is position 1, the positions of the four phosphonic acid groups are position 1, position 2, position 4 and position 5 (or position 1, position 3, position 4 and position 6). In the case that there are phosphonic acid groups present at position 1, position 2, position 4 and position 5, position 3 or position 6 is nitrated and no substituents are present at position 6 or position 3, and the $R^3$ group is not present. In the case that the positions of four phosphonic acid groups are at position 1, position 2, position 3 and position 4, or position 1, position 2, position 3 and position 5, or the like, there is a phosphonic acid group present at the para position relative to the introduced nitro group, and therefore it is not appropriate.

By selecting the starting compound as described above, as to the intermediate compound of Scheme 2, compounds in which the meta position relative to the phosphonic acid group is nitrated and in which no substituents are present at the para position relative to the nitro group are obtained at a high yield.

According to Monomer Production Embodiment 2 described above, it is possible to obtain the monomer substantially with the two steps described above only, and an aniline monomer compound can be obtained with a relatively high yield without many steps to be required.

Monomer Production Embodiment 3

In the case that substituted or unsubstituted halogenated nitrobenzene, for example, is used as a raw material in the method for producing a monomer compound, a dialkyl phosphite is bound to the substituted or unsubstituted halogenated nitrobenzene, and then a nitro group is reduced with hydrogen to obtain an amino group, and then, an alkyl group is hydrolyzed, thereby it is possible to obtain substituted or unsubstituted aminophenylphosphonic acid (Scheme 3). In this regard, Hirao reaction can be used as the method for binding a dialkyl phosphite to the halogenated nitrobenzene.

<Scheme 3>

[Chemical Formula 21]

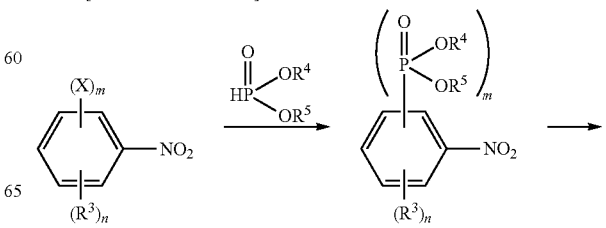

-continued

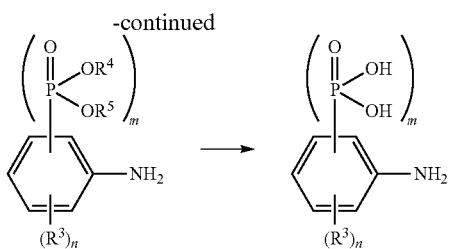

wherein the definitions of $R^3$, m, n, X, $R^4$ and $R^5$ are the same as the definitions in Scheme 1 described above. However, no substituents are present at the para position relative to the nitro group or amino group.

According to Monomer Production Embodiments 1 to 3 described above, it is possible to obtain an aminophenylphosphonic acid, which is a raw material monomer, or a salt thereof without the need of going through many purification steps at a relatively high yield.

(Salt of Aminophenylphosphonic Acid)

When a salt of aminophenylphosphonic acid is used as an aniline monomer compound, those obtained by any of the conventionally and publicly known methods can be used as the salt of aminophenylphosphonic acid. For example, such a salt can be obtained by using a method for treating a substituted or unsubstituted aminophenylphosphonic acid with a hydrogen halide, metal hydroxide, ammonia or the like.

(Other Monomers)

In the method for producing a polyaniline according to the present invention, it is preferable to use only an aniline monomer compound having a substituted or unsubstituted phosphonic acid or a salt thereof, or a mixture as described above as a monomer in a polymerization reaction. However, as needs arise, a monomer mixture to be a raw material in producing polyaniline may comprise a small amount, which does not inhibit the effects of the present invention, of an oxidatively-polymerizable monomer (hereinafter, referred to as "other type monomer"), other than the aniline monomer compound having substituted or unsubstituted phosphonic acid or a salt thereof described above. That is, a substituted or unsubstituted aniline monomer compound that does not have a phosphonic acid or a salt thereof may be copolymerized in accordance with the needs. For example, a small amount of a substituted or unsubstituted aniline monomer compound that does not have an acidic substituent may be used, and a small amount of a substituted or unsubstituted aniline monomer compound having an acidic substituent (e.g., sulfonic acid) other than phosphonic acid may be used. Alternatively, a small amount of a substituted or unsubstituted aniline monomer compound (e.g., aminobenzylphosphonic acid described in Non-Patent Document 1) in which a phosphonic acid group is not directly bound to the benzene ring, but is indirectly bound thereto, may be used.

However, if an excessive amount of the other type monomer described above is used, the advantage of the present invention will be lost. Thus, it is preferable not to use a too much amount of the other type monomer. The amount of the other type monomer to be used is preferably 40 mol % or less of the total amount of the substituted or unsubstituted aniline monomer compounds to be used for a polymerization, more preferably 30 mol % or less, further preferably 20 mol % or less, still more preferably 10 mol % or less, yet still more preferably 5 mol % or less, particularly preferably 3 mol % or less, and most preferably 1 mol % or less.

(Production of Polyaniline)

Polyaniline can be produced by using a step of preparing an aniline monomer compound or an aniline monomer mixture, and a step of polymerizing an aniline monomer compound or an aniline monomer mixture. In accordance with needs, a step of purification can be further performed on polyaniline obtained by a polymerization.

(Polymerization Reaction)

By polymerizing an aniline monomer compound or an aniline monomer mixture, polyaniline is obtained. With regard to polymerization methods, any of conventionally and publicly known methods can be applied as a polymerizing method for obtaining polyaniline from an aniline monomer.

Preferably, a method called oxidative polymerization can be applied.

In the present specification, an "oxidative polymerization" means a reaction in which an aniline monomer compound or an aniline monomer mixture is polymerized with an oxidizing agent to synthesize a polyaniline. Herein, "oxidization" means to pull out a hydrogen atom from the aniline monomer compound in the subject polymerization reaction. As used herein, "oxidizing agent" refers to a reagent that causes such an oxidization reaction. The mechanism of an oxidative polymerization of aniline monomers is described in, for example, Non-Patent Document 5 described above and the like. With regard to the term of oxidative polymerization, Kagaku Daijiten (Encyclopaedia Chimica) describes it as "refers to a process in which a compound having a hydrocarbon residue including a double bond contacts oxygen to be polymerized gradually. The best example is drying of fats and oils." However, a polymerization of aniline monomers does not generally use oxygen in the air as an oxidizing agent. Therefore, in this regard, the term of "oxidative polymerization" in the present specification has a slightly different meaning from the meaning used in the Kagaku Daijiten or the like.

(Oxidizing Agent)

In the polymerization reaction according to the present invention, a hydrogen atom is removed from an aniline monomer compound. That is, the polymerization reaction proceeds while it is accompanied with a reaction in which the aniline monomer is oxidized. Thus, the polymerization reaction is performed in the presence of an oxidizing agent for causing this dehydrogenating. With regard to the oxidizing agent, oxidizing agents that are generally used for an oxidative polymerization of polyaniline can be used. Preferably usable specific examples include peroxodisulfates (e.g., ammonium peroxodisulfate, and sodium peroxodisulfate), peroxosulfates (e.g., sodium peroxosulfate), hydrogen peroxide, ferric chloride and the like. More preferably used examples include ammonium peroxodisulfate.

The amount of oxidizing agent to be used is not limited as long as it is an amount to allow a polymerization to proceed. It is preferably 0.5 equivalents or more with respect to the total amount of the aniline monomers to be polymerized, and it is more preferably 0.7 equivalents or more, further preferably 1.0 equivalent or more, particularly preferably 1.5 equivalents or more, and most preferably 2.0 equivalents or more. Furthermore, in accordance with needs, the amount can be 2.1 equivalents or more, 2.2 equivalents or more, 2.4 equivalents or more, 2.6 equivalents or more, 2.8 equivalents or more or 3.0 equivalents or more. In addition, it is preferably 10 equivalents or less with respect to the total amount of the aniline monomers to be polymerized, and it is more preferably 8 equivalents or less, further preferably 6 equivalents or less, particularly preferably 5 equivalents or less, and most preferably 4 equivalents or less. In addition, in accordance with the needs, the amount can be 3.9 equivalents or less, 3.7 equivalents or less, 3.6 equivalents or less, 3.5 equivalents or less, 3.4 equivalents or less, 3.3 equivalents or less, 3.2 equivalents or less, or 3.1 equivalents or less.

It should be noted that herein, 1 equivalent refers to the amount (number of mol) of an oxidizing agent to pull out one mol of hydrogen atoms from an aniline monomer. For example, if 1 mol of an oxidizing agent, such as persulfate, can pull out 2 moles of hydrogen, 0.5 moles of the oxidizing agent is 1 equivalent.

If the amount of the oxidizing agent used is within an appropriate range, then the reaction proceeds smoothly, and a conductive polyaniline can be obtained efficiently. If the amount of the oxidizing agent used is too small, or too much, the efficiency of the polymerization reaction tends to be deteriorated.

It should be noted that oxygen in the air does not usually act as an oxidizing agent for a polymerization of an aniline monomer. Thus, even in the case when a polymerization reaction is performed in the presence of the air, oxygen in the air is usually not included in the amount of the oxidizing agent used for the polymerization reaction. That is, there is a case when the term of "oxidative polymerization" is used to mean a polymerization reaction in which oxygen present in the air is used as an oxidizing agent; however, the polymerization reaction according to the present invention is different from such a polymerization reaction.

(Solvent)

For a polymerization reaction, solvents may be used in accordance with the needs. As to the solvents, any liquid that can dissolve or disperse an aniline monomer compound can be used. Liquid that can dissolve an aniline monomer compound is preferable.

Specifically, preferable solvents include ammonia water, pyridine water, pyridine, triethylamine water, triethylamine, water, hydrochloric acid, methanol, ethanol, isopropanol, acetonitrile, dimethylformamide, acetone, 2-butanone, dimethylacetamide and the like. More preferable solvents include ammonia water, pyridine water, pyridine, triethylamine water, and triethylamine. It should be noted that the present specification describes aqueous solutions of basic compounds in the same manner as "ammonia water". That is, "pyridine water" refers to a solution obtained by dissolving pyridine in water. Furthermore, "triethylamine water" refers to a solution obtained by dissolving triethylamine in water.

In one preferable embodiment, solutions obtained by dissolving a basic liquid compound or a basic compound in water (e.g., ammonia water and pyridine water described above and the like) are used as solvents. Note that the basic compound is not necessarily in a completely dissolved state in the solution, and the basic compound may be in a state referred to as, so-called, a mixture. That is, the basic compound is not necessarily in a completely dissolved state so long as the basic compound and water are well mixed with each other to be in a state where the mixture can function as a mixed solvent. Such basic compounds that are mixed with water to form a preferable mixed solvent include compounds containing basic nitrogen, more specifically, ammonia, aromatic amine compounds, aliphatic amine compounds and the like. Examples of the aromatic amine compounds include heterocyclic compounds having nitrogen as a hetero atom (e.g., pyridine, pyrazine, imidazole, pyrazole, and thiazole) and the like. In the aromatic ring of the aromatic amine compounds, a substituent such as an alkyl group and halogen may be present. The aliphatic amine compounds may be chain aliphatic amine compounds, or may be cyclic aliphatic amine compounds (e.g., piperidine). The cyclic aliphatic amine compounds may be a primary amine, secondary amine, or tertiary amine. The chain aliphatic amine compounds may be a primary amine, secondary amine, or tertiary amine. Examples of the chain aliphatic primary compounds include, for example, a compound in which one or more amino groups are bound to an alkyl group. Examples of the chain aliphatic secondary compounds include, for example, a compound in which two alkyl groups are bound to a —NH— group. Examples of the chain tertiary compounds include, for example, a compound in which three alkyl groups are bound to a nitrogen atom (trialkylamine) (e.g., triethylamine, tributylamine, tri-n-decylamine).

In this regard, the concentration of the basic compound in an aqueous solution of the basic compound is not particularly limited. For example, the concentration can be 0.01M or more, can be 0.1M or more, and can be even 1M or more. In addition, the concentration can be 10M or less, can be 7M or less, or can be even 5M or less.

In a preferable embodiment, an aniline monomer compound is dissolved in the solvent described above to prepare a solution of the aniline monomer compound, and an oxidizing agent is separately dissolved in a solvent to prepare a solution of the oxidizing agent, and the aniline monomer compound solution and the oxidizing agent solution are mixed with each other to perform a polymerization reaction. In this regard, as to the solvent for dissolving the oxidizing agent, any solvents capable of dissolving the oxidizing agent can be used. In a preferable embodiment, the solvent for dissolving the oxidizing agent is water.

(Reaction Temperature)

The reaction temperature in the polymerization according to the present invention is not particularly limited as long as it is a temperature to allow a polymerization reaction to proceed. Preferably, the reaction temperature is −20° C. or higher, more preferably −15° C. or higher, and further preferably −10° C. or higher, and it is possible to set the reaction temperature to be 0° C. or higher. Furthermore, the reaction temperature is preferably 80° C. or lower, more preferably 70° C. or lower, further preferably 60° C. or lower, still more preferably 50° C. or lower, even still more preferably 40° C. or lower, particularly preferably 30° C. or lower, and most preferably 20° C. or lower, and it is also possible to set the reaction temperature to be 10° C. or lower.

When the reaction temperature is within the appropriate range described above, the yield is favorable and a polyaminophenylphosphonic acid derivative having excellent conductivity is obtained. If the reaction temperature is too low or too high, the reaction efficiency tends to be deteriorated.

(Reaction Time)

As to the reaction time of the polymerization according to the present invention, sufficient time for reaction may be appropriately selected in accordance with various conditions. As long as the reaction proceeds sufficiently, the difference in the reaction time will not greatly influence the effect of the present invention.

The reaction time is preferably 1 hour or longer, more preferably 3 hours or longer, further preferably 6 hours or longer, still more preferably 9 hours or longer, and particularly preferably 12 hours or longer, and in accordance with the needs, the reaction time can be 15 hours or longer, 18 hours or longer, 21 hours or longer, or 24 hours or longer. In addition, the reaction time is preferably 7 days or shorter, more preferably, 5 days or shorter, further preferably, 3 days or shorter, still more preferably 2 days or shorter, and particularly preferably 36 hours or shorter, and in accordance with the needs, the reaction time can be 30 hours or shorter, 28 hours or shorter, or 26 hours or shorter.

(Purification)

Purification operations may be performed on the polyaniline obtained by a polymerization reaction in accordance with the needs. As to the purification operations, any publicly known methods as a method for purifying a polyaniline can be used. For example, centrifugation, filtration, dehydration, drying, distillation, washing, ultrafiltration, dialysis and other operations can be performed. Neither the number of times for nor the type of the purification operations is particularly limited. One type of purification operation may be performed one time only to end the purification operations, but in accordance with the needs, the purification operations may be performed two times or more. For example, the purification operations may be performed three times or more, four times or more, or five times or more. In this regard, one type of purification operations may be repeatedly performed two times or more, and a plurality of types of purification operations may be combined and such purification operations may be performed two times or more in total. There is no particular upper limit on the number of times for the purification operations. However, the number of times for the purification operations is preferably twenty times or less, more preferably fifteen times or less, and further preferably ten times or less. When the number of times is too many, a long period of time will be required as a whole producing process, which deteriorates the producing efficiency.

(Ion Exchange)

Ion exchange may be performed in accordance with the needs on the polyaniline obtained by a polymerization reaction to adjust the amount of doping. Ion exchange can be performed with an acidic aqueous solution or an ion exchange resin.

Specifically, if the amount of hydrogen of the phosphonic acid or monohydrogen phosphonate of the polyaniline obtained by a polymerization is smaller than the desirable amount as an overall polymer, then metal ions, pyridinium ions or ammonium ions bound to the phosphonic acid may be ion-exchanged to hydrogen ions, and thereby the effect of doping can be enhanced.

In contrast, if the amount of hydrogen of the phosphonic acid or monohydrogen phosphonate of the polyaniline obtained by a polymerization is too much larger than the desirable amount as overall polymer, then hydrogen ions of the phosphonic acid or monohydrogen phosphonate may be ion-exchanged to other ions (e.g., alkali metal ions, ammonium ions, pyridinium ions or the like), and thereby the effect of doping can be attenuated.

Ion exchange may be performed after a polymerization of polyaniline. It is also possible to perform ion exchange at the same time as the operations for purification described above. Furthermore, ion exchange may be performed before purification, or may be performed after the operations for purification. For example, if purification is performed by filtration, ion exchange resin may be filled in the column for the filtration, so that ion exchange can be performed at the same time as the purification by filtration.

As to the method for ion exchange, conventionally and publicly known methods for ion exchange can be used.

For example, if an acidic aqueous solution is used, ion exchange can be performed by contacting a polyaniline product obtained by a polymerization to an acidic aqueous solution. Specifically, for example, ion exchange can be performed by a method of stirring the polyaniline product in an acidic aqueous solution to allow the moiety of a salt of the phosphonic acid salt compound present in the polyaniline product to react with hydrogen ions in the aqueous solution. If the amount of hydrogen ions is increased to enhance the effect of doping, it is preferable to use an excess amount of acid for the acidic substituent of the polyaniline product. The amount of acid used may be decreased in order to attenuate the effect of doping. Specifically, the effect of doping can be arbitrarily adjusted in accordance with the amount of acid to be used. In addition, the period of time for the reaction between the polyaniline product and acid can also be arbitrarily adjusted.

For example, in the case that an ion exchange resin is used, ion exchange can be performed by using a method for allowing a polyaniline product to contact with ion exchange resin in water. In the case of increasing hydrogen ions in order to enhance the effect of doping, it is preferable to use strongly acidic cation exchange resin. In the case of decreasing hydrogen ions in order to lower the effect of doping, it is preferable to use a strongly basic cation exchange resin. Any methods can be used as a method for allowing a polyaniline product to contact with an ion exchange resin. For example, an ion exchange resin may be put in a column, and a solution containing a polyaniline product may be allowed to flow therethrough. Alternatively, an ion exchange resin may be simply put in a container, and a solution containing a polyaniline product may be put in the container. In addition, when a polyaniline product is allowed to contact with an ion exchange resin, a container in which the polyaniline product and the ion exchange resin are put may be shaken, or the solution may be stirred, to improve the efficiency. The period of time for which a polyaniline product is allowed to contact with an ion exchange resin can be arbitrarily determined. For example, in the case that a small amount (e.g., one droplet) of a polyaniline product solution is allowed to flow through a column, the time is determined from the time when the small amount of the solution contacts the upper part of the ion exchange resin until the time when the solution flows away from the bottom part of the ion exchange resin. Furthermore, for example, in the case that a large amount of a polyaniline product solution is allowed to flow through a column, the time is determined as an average of the time when the first part of the solution contacts the upper part of the ion exchange resin until the time when the first part flows away from the bottom part of the ion exchange resin and the time when the last part of the solution contacts the upper part of the ion exchange resin until the time when the last part flows away from the bottom part of the ion exchange resin. Furthermore, in the case that an ion exchange resin and a polyaniline product solution are put in a container, the time is determined as the period of time during which the solution and the ion exchange resin are mixed with each other in the container.

While the period of time for which one time operation of ion exchange for a polyaniline product is performed (e.g., contacting time between the polyaniline product described above and an acidic aqueous solution or contacting time between the ion exchange resin and the polyaniline product) is arbitrarily determined in accordance with the level of the desired ion exchange, the period of time is, for example, preferably five second or more, more preferably ten seconds or more, further preferably one minute or more, and still more preferably ten minutes or more. If the contacting time is too short, then ion exchange tends to be insufficient. In addition, the period of time is preferably one day or less, more preferably twelve hours or less, and further preferably two hours or less. If the contacting time is too long, then a long period of time will be required as a whole producing process, which deteriorates the producing efficiency.

The number of times for operating ion exchange is not particularly limited. The ion exchange may be completed with one time only operation of ion exchange for a polyaniline product, or the operation of ion exchange may be repeatedly performed two times or more. When the operation is repeatedly performed two times or more, a polyaniline with a high doping effect can be readily obtained. Specifically, the operation of ion exchange is repeatedly performed, preferably three times or more, more preferably four times or more, and further preferably five times or more. In addition, the number of times to perform the operation of ion exchange is preferably twenty times or less, more preferably fifteen times or less, and further preferably ten times or less. If the operation of ion exchange is repeated too many times, then a long period of time will be required as a whole producing process, which deteriorates the producing efficiency.

In addition, in the case that the operation of ion exchange is performed two times or more, only the same operation of ion exchange may be performed two times or more, or two types or more of the operation of ion exchange may be performed.

In one preferable embodiment, the operation of ion exchange can be combined with an operation of purification to form a series of steps. For example, an acidic aqueous solution is added to a polyaniline product to perform ion exchange, and then a purification step (e.g., centrifugation) of the crude polyaniline product is performed to remove water or the like, and a polyaniline, of which purity has been increased is extracted, and thereby a polymer having high doping efficiency and high purity can be obtained. Furthermore, the series of steps in which the operation of ion exchange is combined with the operation of purification may be defined as one cycle, and this cycle may be repeatedly performed multiple times. For example, a series of steps may be repeated, in which an acidic aqueous solution is added to a polyaniline product to perform ion exchange, and then a purification step (e.g., centrifugation) of the polyaniline product is performed and the polyaniline with higher purity is removed, and an acidic aqueous solution is again added to the polyaniline after the first purification to perform the second ion exchange, and then the purification step is again performed to remove the polyaniline with even higher purity after the second purification. As a result, polymer with extremely high doping efficiency and with high purity can be obtained efficiently. That is, polymer with high purity and with high conductivity can be obtained efficiently. The number of times to repeat the cycle consisting of a series of steps comprising the operation of ion exchange and the operation of purification is not particularly limited. Specifically, the cycle is repeatedly performed, preferably three times or more. The cycle is repeatedly performed more preferably four times or more, and the cycle is repeatedly performed further preferably five times or more. Furthermore, the cycle is repeatedly performed, preferably twenty times or less, more preferably fifteen times or less, and further preferably ten times or less. If the cycle is repeated too many times, then a long period of time will be required as a whole producing process, which deteriorates the producing efficiency.

(Polyaniline)

The polyaniline having a phosphonic acid group produced using the producing method described above is, for example, represented by the general formula (1):

$$-(A)_q- \tag{1}$$

wherein A is each independently an aniline monomer residue. q represents the degree of polymerization, and it is any positive integer. Specifically, the number can be defined to be, for example, 4 or greater, 10 or greater, 100 or greater or 200 or greater, and the number can be defined to be 2,000 or smaller, 1,000 or smaller, 800 or smaller, or 600 or smaller. The molecular weight of the polyaniline of the general formula (1) is an amount that corresponds to the degree of polymerization. It should be noted that with regard to the number average molecular weight and weight average molecular weight, the above description with regard to the polyaniline in the present specification also applies to the polyaniline of the general formula (1).

Adjacent aniline monomer residues are bound to each other at the para position. That is, when the second aniline monomer residue is bound to the first aniline monomer residue and the third aniline monomer residue is bound to the second aniline monomer residue, the first aniline monomer residue and the third aniline monomer residue are in a para positional relationship in the benzene ring in the second aniline monomer residue.

It should be noted that when a structure of a polyaniline is described with a general formula, it is generally the case that both terminals thereof are omitted. Thus, when a structure of a polyaniline is described in the present specification, both terminals are omitted in principle. However, for example, when both terminal groups are intentionally described in the general formula (1) described above, the following general formula (1A) will be obtained.

$$E^1-(A)_q-E^2 \tag{1A}$$

wherein $E^1$ and $E^2$ are each a terminal group. Normally, one of them is a polymerization initiating terminal and the other is a polymerization ending terminal.

The structure of the terminal of a polyaniline has not been fully elucidated. As can be simply expected from the chemical structure of an aniline monomer, in the case that a reaction occurs that causes an amine moiety of an aniline monomer to be bound to a para position of another aniline monomer, it is considered that hydrogen at the para position remains still to form a terminal in an aniline monomer residue in one of the terminals of the polyaniline, and an amino group remains still to form a terminal in an aniline monomer residue of the other terminal. For example, in an article of Yano et al., BUNSEKI KAGAKU Vol. 46, No. 5, pp. 343-349, a polymerization of such a polyaniline is described in the reaction formulas (1) to (4) on page 348. In addition, paragraph 0007 of Japanese Laid-Open Publication No. 2003-192786 describes a polymerization of such a polyaniline. In this case, when hydrogen of both terminals (hydrogen at the para position of one terminal and hydrogen in the amino group of the other terminal) is intentionally described in the formula (1) described above, it is described in the following general formula (1B).

$$[H-A_q-H] \tag{1B}$$

On the other hand, for example, J. Stejekal et al., Progress in Polymer Science 35 (2010) 1420 to 1481, and Mukai et al., Keio Gijuku Daigaku Hiyoshi Kiyou, Shizen Kagaku (The Hiyoshi review of the natural science), No. 50 (2011. 9), p. 61-75 describe that an aniline oligomer having a phenazine ring structure is produced at the initial stage of a polymerization of aniline, and the oligomer residue thereof becomes a polymerization initiating-side terminal of a polymer, thus forming a polymer of the structure represented by the following formula.

[Chemical Formula 23]

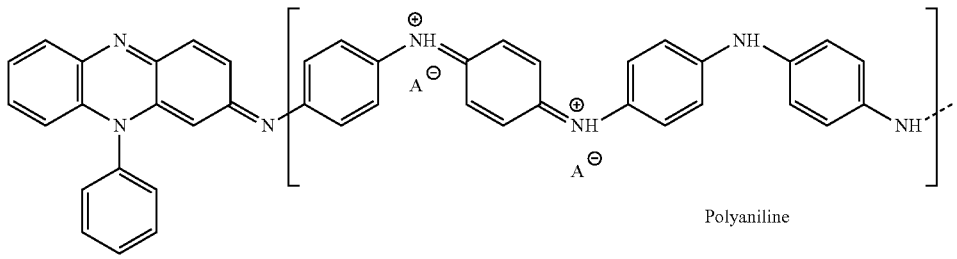

Polyaniline

However, even if such a structure different from the structure of the monomer residue in the repeating unit is present in the terminal, the type of the terminal group of the polyaniline has a small influence on the performance of the polyaniline. Thus, the structure of the terminal residue can be ignored.

The monomer residues ("A" in the general formula (1) described above) in a polyaniline may all be the same, or may have a plurality of types. That is, the polymer may be a homopolymer, or the polymer may be a copolymer. It is preferable that the polymer is a copolymer. Furthermore, such a copolymer may be a block copolymer, or may be a random copolymer. In such a random copolymer, a plurality of types of monomer residues are arranged at random. It should be noted that as described in Non-Patent Document 5 described above, a polyaniline obtained by oxidatively polymerizing an aniline monomer is known to have a structure having certain regular repeating units. It is considered that a polyaniline having such regularity can also be produced using the producing method according to the present invention, and a polyaniline having such regularity can be used as a target polymer of the producing method according to the present invention.

A polyaniline comprises a monomer residue that has at least a phosphonic acid group (—$PO_3H_2$) or a monohydrogen phosphonate group (—$PO_3HM$, wherein M is selected from the group consisting of an alkali metal, alkaline earth metal, ammonium group, and pyridinium group). The phosphonic acid group or monohydrogen phosphonate group can perform doping to nitrogen of a polyaniline main chain, due to the hydrogen atom.

It should be noted that in the present specification, the monohydrogen phosphonate group means a group having a structure of a monohydrogen phosphonate. Specifically, it means a group obtained when only one of the two hydrogens of a phosphonic acid group is substituted with a metal atom or the like to be a salt, and the other hydrogen remains intact.

The monomer residue A in the general formula (1) described above is represented by, for example, the following general formula (2).

[Chemical Formula 24]

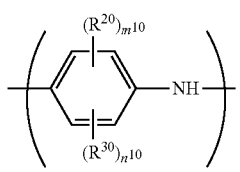

(2)

In the general formula (2) described above, $R^{30}$ is each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group. $m^{10}$ is an integer of 1 to 4, $n^{10}$ is an integer of 0 to 3, and the sum of $m^{10}$ and $n^{10}$ is 1 to 4. In addition, $R^{20}$ in general is a group of the following general formula (2A):

[Chemical Formula 25]

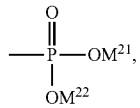

(2A)

wherein $M^{21}$ and $M^{22}$ are each independently selected from the group consisting of a hydrogen atom, alkali metal, alkaline earth metal, ammonium group, and pyridinium group, with the proviso that when at least one of $M^{21}$ and $M^{22}$ is an alkaline earth metal, the polyaniline has a structure in which any two of all the $M^{21}$ and $M^{22}$ present in the molecule are in conjunction with each other to be each of the alkaline earth metal.

By comprising such a structure, the polyaniline obtained by using the producing method according to the present invention demonstrates water solubility and conductivity.

In general, polyaniline is known to take two types of skeletons of: a phenylenediamine skeleton of a reduced form unit of the following general formula (15):

[Chemical Formula 26]

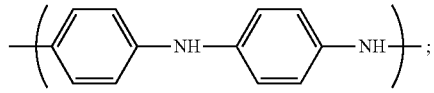

(15)

and a quinonediimine skeleton of an oxidized form unit of the following general formula (16):

[Chemical Formula 27]

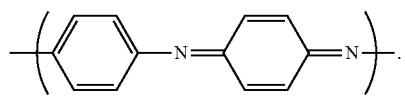

(16)

Thus, the polyaniline obtained by using the producing method according to the present invention can be such a polyaniline that has the skeleton structure of the general formula (16) described above.

The polyaniline obtained by using the producing method according to the present invention comprises an aniline monomer residue having a phosphonic acid group or monohydrogen phosphonate that is capable of providing proton, due to the action of self-doping. However, it is not necessary for all the monomer residues to have a substituent capable of providing a proton.

Thus, the polyaniline obtained by using the producing method according to the present invention may comprise, in the aniline monomer residue thereof, a monomer residue that does not have a doping action as a repeating unit, to the extent that the effect of the present invention is not inhibited. For example, included is a repeating unit represented by the following general formula (3):

[Chemical Formula 29]

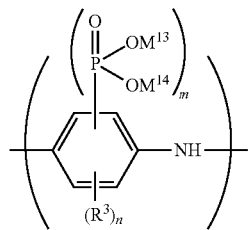

(3)

(wherein $R^3$, n and m are defined to be the same as the definitions in the general formula (4) described above, $M^{13}$ and $M^{14}$ are each independently at least one selected from the group consisting of an alkali metal, alkaline earth metal, ammonium group and pyridinium group).

In consideration of the fact that a quinonediimine skeleton is formed in a polyaniline as described above, the general formula (1) of the polyaniline described above can be described as the following general formula (9).

[Chemical Formula 30]

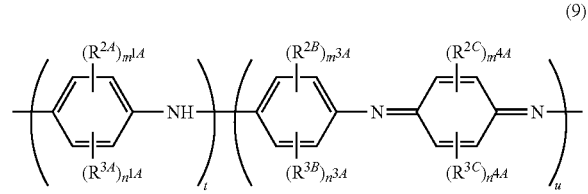

(9)

In the formula described above, $m^{1A}$, $m^{3A}$ and $m^{4A}$ are each independently an integer of 0 to 4, $n^{1A}$, $n^{3A}$ and $n^{4A}$ are each independently an integer of 0 to 4, the sum of $m^{1A}$ and $n^{1A}$ is 1 to 4, the sum of $m^{3A}$ and $n^{3A}$ is 1 to 4, the sum of $m^{4A}$ and $n^{4A}$ is 1 to 4, $R^{3A}$, $R^{3B}$ and $R^{3C}$ are each independently defined to be the same as the definitions in the general formula (4) described above, and $R^{2A}$, $R^{2B}$ and $R^{2C}$ are each independently a group represented by the following general formula (2A).

[Chemical Formula 31]

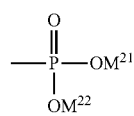

(2A)

wherein $M^{21}$ and $M^{22}$ are each independently selected from the group consisting of a hydrogen atom, alkali metal, alkaline earth metal, ammonium group, and pyridinium group, with the proviso that when at least one of $M^{21}$ and $M^{22}$ is an alkaline earth metal, the polyaniline has a structure in which any two of all the $M^{21}$ and $M^{22}$ present in the molecule are in conjunction with each other to be each of the alkaline earth metal.

Furthermore, in the general formula (9), t and u are each a number indicating the degree of polymerization, wherein each structure is a unit, which is any positive integer. The sum of t and u times 2 corresponds to the degree of polymerization of the entire polymer, i.e., q in the general formula (1). It is preferable for t to be equal to or almost equal to twice the u.

With regard to the phenylenediamine structure and quinonediimine structure present in the polyaniline, the document described above in regard to the description of prior art: Hino et al., Yamagata University Kiyou (engineering), Vol. 29, No. 2, February, Heisei-19 (Non-Patent Document 5) includes the following description.

A tetramer in a polyaniline is considered as one structural unit.

Due to an oxidative polymerization, acid components enter a polyaniline immediately after synthesis as a dopant and are bound electrostatically, and thus an electric conductor in a half oxidation state was obtained. The polyaniline in this state has a green emerald color, and is referred to as an emeraldine salt. It demonstrates conductivity.

When the emeraldine salt is treated in an alkaline solution, an inorganic acid is removed from the salt of the inorganic acid to form a dedoped state, and its color turns from green to blue, and it is allowed to have an insulating structure referred to as an emeraldine base.

When the emeraldine salt in a half oxidation state is reduced, it becomes a polyaniline in a complete reduced state referred to as a leucoemeraldine.

When the emeraldine base in a half oxidation state is further oxidized, pernigraniline in a complete oxidation state is obtained.

With regard to a polyaniline, only the emeraldine salt demonstrates conductivity, and the emeraldine base, leucoemeraldine, and pernigraniline do not demonstrate conductivity.

Thus, the subject document describes four types of polyanilines as described below.

[Chemical Formula 32]

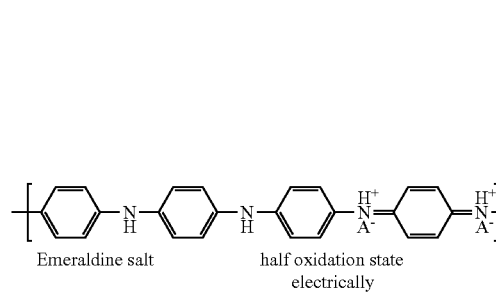

Emeraldine salt    half oxidation state
                   electrically
                   conductive alkali
treatment
dedoping
⇌
protonation

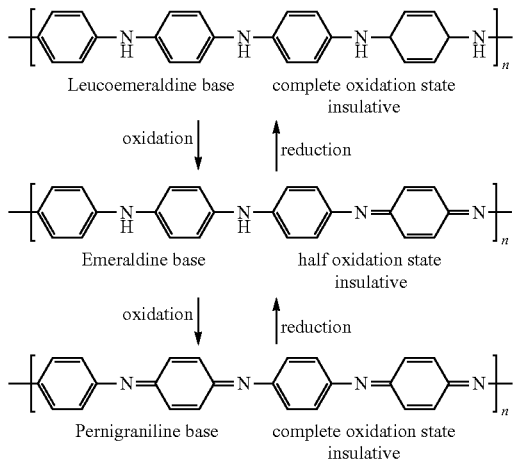

Leucoemeraldine base    complete oxidation state
                        insulative Emeraldine base    half oxidation state
                   insulative Pernigraniline base    complete oxidation state
                       insulative As described above, it is publicly known that when an aniline monomer is oxidatively polymerized, a conductive polyaniline of a structure referred to as an emeraldine salt is first obtained. In addition, with regard to polyanilines of three types of structures other than the emeraldine salt, they are publicly known to be obtained by dedoping the emeraldine salt, followed by performing oxidation or reduction as needed.

Thus, in the present invention as well, it is understood that when an aniline monomer is oxidatively polymerized, a conductive polyaniline having a structure of an emeraldine salt is obtained.

When the structure of the polyaniline obtained by using the producing method according to the present invention is described by dividing it into a phenylenediamine type structure ($A^{1A}$) and a quinonediimine type structure ($A^{2A}$), the structure can be represented by the following general formula (9A).

$$[-A^{1A}_r-A^{2A}_s-] \tag{9A}$$

In this regard, r is the number of the phenylenediamine type structure ($A^{1A}$), and is any positive integer. s is the number of the quinonediimine type structure ($A^{2A}$), and is any positive integer.

In the general formula (9A) described above, the two types of partial structures can be arranged in any manner. That is, the general formula (9A) described above is not meant to be limited to such a polymer in which a block $[-A^{1A}_r-]$ of the phenylenediamine type structure and a block $[A^{2A}_s-]$ of the quinonediimine type structure are linked with each other. Specifically, the $[-A^{1A}-]$ of the phenylenediamine type structure and the $[-A^{2A}-]$ of the quinonediimine type structural unit may be present at random, or the structure may be such that the $[-A^{1A}-]$ of the phenylenediamine type structure and the $[-A^{2A}-]$ of the quinonediimine type structural unit are repeated in accordance with a certain regularity. In general, in the oxidative polymerization of aniline, the structure in which the $[-A^{1A}-]$ of the phenylenediamine type structural unit and the $[-A^{2A}-]$ of the quinonediimine type structural unit are alternately linked is known to be mainly formed. In the case that a polyaniline has a completely alternately linked structure, the number of the phenylenediamine type structural unit and the number of the quinonediimine type structural unit will be the same (i.e., r=s), and the general formula (9A) described above, will be the general formula (9B) below.

$$[-A^{1A}-A^{2A}-]_r \tag{9B}$$

In reality, however, a polyaniline does not necessarily have to have the completely alternately linked structure, and thus it is not necessarily that r=s. It is considered that as long as r and s are numbers that are not greatly different from each other, it becomes possible for the alternate and repeated linking of the $[-A^{1A}-]$ of the phenylenediamine type structural unit and $[-A^{2A}-]$ of the quinonediimine type structural unit described above to be a major component in the polymer, and the characteristic of the alternate and repeated structure can be exhibited as the overall polymer. As a matter of course, it is preferable for r and s not to be greatly different from each other. Specifically, for example, s is preferably 0.2 times r or more, more preferably 0.33 times r or more, further preferably 0.5 times r or more, particularly preferably 0.8 times r or more, and most preferably 0.9 times r or more. In addition, s is preferably 5 times r or less, more preferably 3 times r or less, further preferably 2 times r or less, particularly preferably 1.25 times r or less, and most preferably 1.1 times r or less.

While a polyaniline obtained by using the producing method according to the present invention can have the structure of the general formula (9B) described above, $[-A^{1A}-]$ of the phenylenediamine type structural unit and $[-A^{2A}-]$ of the quinonediimine type structural unit thereof can be each independently either a structure having a hydrogen and thus having a doping action, or a structure having no hydrogen and thus having no doping action. In order for a polyaniline to have high conductivity, it is preferable that all or almost all the polymer consists of the structure having hydrogen and thus having a doping action, but a structure that does not have hydrogen may be included in accordance with the needs.

Thus, with regard to the polyaniline obtained by using the producing method according to the present invention, if the monomer residue thereof is divided into a phenylenediamine type structure having hydrogen ($A^1$), a quinonediimine type structure having hydrogen ($A^2$), phenylenediamine type structure having no hydrogen ($A^3$) and a quinonediimine type structure having no hydrogen ($A^4$), and the structure is described, then the structure is represented by the general formula (10) below:

$$[-A^1_g-A^2_h-A^3_j-A^4_k-] \qquad (10).$$

In this regard, g is any integer of 1 or greater, g is preferably 5 or greater. In addition, g is more preferably 25 or greater, and further preferably 50 or greater. Furthermore, in accordance with the needs, g may be 100 or greater, 200 or greater, 400 or greater, or 500 or greater. In addition, g is preferably 1,000 or smaller. More preferably, g is 500 or smaller. When g is small, it becomes difficult to sufficiently exert a desired performance as a polyaniline. When g is too great, it becomes difficult to produce the polyaniline in an efficient manner.

h is any integer of 0 or greater, and h is preferably 1 or greater. More preferably, his 5 or greater, and further preferably 25 or greater. Particularly preferably, h is 50 or greater. Furthermore, in accordance with the needs, h may be 100 or greater, 200 or greater, 400 or greater, or 500 or greater. In addition, h is preferably 1,000 or smaller. More preferably, h is 500 or smaller. When h is small, it becomes difficult to sufficiently exert desired performance as a polyaniline. When h is too great, the efficiency of producing polyaniline tends to be deteriorated.

Theoretically speaking, it is preferable for g and h to be the same number. However, it is not always necessary for them to be the same. As long as g and h are numbers that are not greatly different from each other, preferable performance is considered to be obtained. Specifically, for example, g is preferably 0.2 times h or more, more preferably 0.33 times h or more, and further preferably 0.5 times h or more, particularly preferably 0.8 times h or more, and most preferably 0.9 times h or more. In addition, g is preferably 5 times h or less, more preferably 3 times h or less, further preferably 2 times h or less, particularly preferably 1.25 times h or less, and most preferably 1.1 times h or less.

The sum of g and h is preferably 4 or greater, more preferably 10 or greater, further preferably 50 or greater. It is particularly preferably 100 or greater. Furthermore, the sum of g and h may be, in accordance with the needs, 200 or greater, 400 or greater, 800 or greater, or 1,000 or greater. In addition, the sum of g and h is preferably 2,000 or less. More preferably, the sum of g and h is 1,000 or less. If the sum of g and h is small, then it becomes difficult to sufficiently exert a desired performance as a conductive polyaniline. If the sum is too great, then the efficiency of producing a polyaniline tends to be deteriorated.

j is any integer of 0 or greater, and in one embodiment, j is 0. j may be, in accordance with the needs, 5 or greater, 50 or greater, or 100 or greater. In addition, j is preferably 2,000 or less, more preferably 1,000 or less, further preferably 500 or less and particularly preferably 100 or less.

k is any integer of 0 or greater, and in one embodiment, k is 0. k may be, in accordance with the needs, 5 or greater, 50 or greater, or 100 or greater. In addition, k is preferably 2,000 or less, more preferably 1,000 or less, further preferably 500 or less, and particularly preferably 100 or less.

Theoretically speaking, it is preferable for j and k to be the same number. However, they do not necessarily have to be the same number. It is considered that as long as j and k are numbers that are not greatly different from each other, a preferable performance is exerted. Specifically, for example, j is preferably 0.2 times k or more, more preferably 0.33 times k or more, further preferably 0.5 times k or more, particularly preferably 0.8 times k or more, and most preferably 0.9 times k or more. In addition, j is preferably 5 times k or less, more preferably 3 times k or less, further preferably 2 times k or less, particularly preferably 1.25 times k or less, and most preferably 1.1 times k or less.

In addition, theoretically speaking, the sum of g and j and the sum of h and k are preferably the same number. However, they do not necessarily be the same. It is considered that as long as the sum of g and j and the sum of h and k are numbers that are not greatly different from each other, preferable performance is exerted. Specifically, for example, the sum of g and j is preferably 0.2 times the sum of h and k or more, more preferably 0.33 times the sum of h and k or more, further preferably 0.5 times the sum of h and k or more, particularly preferably 0.8 times the sum of h and k or more, and most preferably 0.9 times the sum of h and k or more. In addition, the sum of g and j is preferably 5 times the sum of h and k or less, more preferably 3 times the sum of h and k or less, further preferably 2 times the sum of h and k or less, particularly preferably 1.25 times the sum of h and k or less, and most preferably 1.1 times the sum of h and k or less.

The sum of j and k is, in one embodiment, 50% or less of the total sum of g, h, j and k, preferably 40% or less of the total sum of g, h, j and k, more preferably 30% or less of the total sum of g, h, j and k, further preferably 20% or less of the total sum of g, h, j and k, still more preferably 10% or less of the total sum of g, h, j and k, particularly preferably 5% or less of the total sum of g, h, j and k, and most preferably 3% or less of the total sum of g, h, j and k, and in accordance with the needs, it is possible to determine the sum to be 1% or less the total sum of g, h, j and k, and even 0.5% or less, 0.3% or less, or 0.1% or less.

In the general formula (10) described above, the arrangement of the four types of the partial structures are arbitrary. That is, the general formula (10) described above should not be interpreted such that the polymer is limited to that in which the four blocks $[-A^1_g-]$, $[-A^2_h-]$, $[-A^3_j-]$ and $[-A^4_k-]$ are linked.

In addition, as described with regard to the general formulas (9A) and (9B) above, a structure in which the phenylenediamine type structural unit and the quinonediimine type structural unit are alternately linked is mainly formed in the oxidative polymerization of a polyaniline, and such a structure is preferable. Thus, in an oxidative polymerization of a polyaniline, a structure in which the phenylenediamine type structural unit and the quinonediimine type structural unit are alternately linked is mainly formed also in the general formula (10), and such an alternate linking structure is considered preferable.

The general formula (9A) and the general formula (10) described above are only different from each other in a representational form of as to whether or not structures should be described separately from the viewpoint of as to whether or not the unit structure has hydrogen. Thus, the two formulas mean substantially the same polymer. $[-A^1_g-]$ and $[-A^3_j-]$ corresponds to $[-A^{1A}_r-]$, and $[-A^2_h-]$ and $[-A^4_k-]$ corresponds to $[-A^{2A}_s-]$. r is a sum of g and j, and s is a sum of h and k.

The monomer residue $A^1$ in the general formula (10) described above is represented by the general formula (11) below:

[Chemical Formula 33]

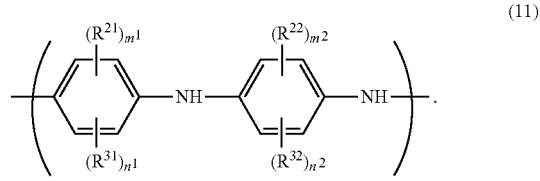

(11)

The monomer residue $A^2$ in the general formula (10) described above is represented by the general formula (12) below:

[Chemical Formula 34]

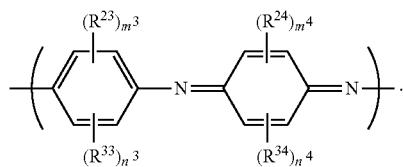
(12)

$A^3$ is represented by the general formula (13) below:

[Chemical Formula 35]

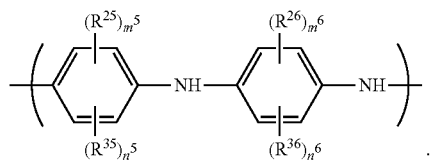
(13)

$A^4$ is represented by the general formula (14) below:

[Chemical Formula 36]

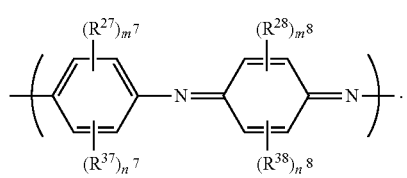
(14)

In the formula described above, $R^{21}$ is a substituent represented by the general formula (21) below:

[Chemical Formula 37]

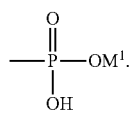
(21)

$R^{22}$ is a substituent represented by the general formula (22) below:

[Chemical Formula 38]

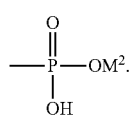
(22)

$R^{23}$ is a substituent represented by the general formula (23) below:

[Chemical Formula 39]

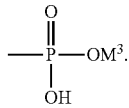
(23)

$R^{24}$ is a substituent represented by the general formula (24) below:

[Chemical Formula 40]

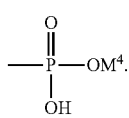
(24)

$R^{25}$ is a substituent represented by the general formula (25) below:

[Chemical Formula 41]

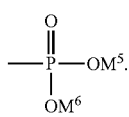
(25)

$R^{26}$ is a substituent represented by the general formula (26) below:

[Chemical Formula 42]

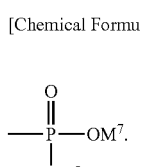
(26)

$R^{27}$ is a substituent represented by the general formula (27) below:

[Chemical Formula 43]

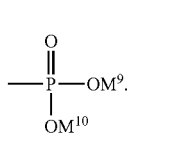
(27)

$R^{28}$ is a substituent represented by the general formula (28) below:

[Chemical Formula 44]

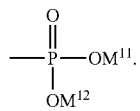
(28)

In this regard, $M^1$ to $M^4$ are each independently selected from the group consisting of a hydrogen atom, alkali metal, alkaline earth metal, ammonium group, and pyridinium group, and $M^5$ to $M^{12}$ are each independently selected from the group consisting of an alkali metal, alkaline earth metal, ammonium group, and pyridinium group. However, when at least one of $M^1$ to $M^{12}$ is an alkaline earth metal, the polyaniline has a structure in which two of $M^1$ to $M^{12}$ are in conjunction with each other to be each of the alkaline earth metal. In a preferable embodiment, $M^1$ to $M^4$ are the same, $M^5$, $M^7$, $M^9$ and $M^{11}$ are the same, and $M^6$, $M^8$, $M^{10}$ and $M^{12}$ are the same. In a more preferable embodiment, $M^1$ to $M^4$ are each a hydrogen atom.

$R^{31}$ to $R^{38}$ are each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group. In a preferable embodiment, $R^{21}$ to $R^{24}$ are the same, $R^{25}$ to $R^{28}$ are the same, $R^{31}$ to $R^{34}$ are the same, and $R^{35}$ to $R^{38}$ are the same. In another preferable embodiment, $R^{31}$ to $R^{38}$ are each an alkyl group in which the number of carbon atoms is 1 to 15 or an alkoxy group in which the number of carbon atoms is 1 to 15.

$m^1$ to $m^8$ are each independently an integer of 1 to 4, $n^1$ to $n^8$ are each independently an integer of 0 to 3, the sum of $m^1$ and $n^1$ is 1 to 4, the sum of $m^2$ and $n^2$ is 1 to 4, the sum of $m^3$ and $n^3$ is 1 to 4, the sum of $m^4$ and $n^4$ is 1 to 4, the sum of $m^5$ and $n^5$ is 1 to 4, the sum of $m^6$ and $n^6$ is 1 to 4, the sum of $m^7$ and $n^7$ is 1 to 4, and the sum of $m^8$ and $n^8$ is 1 to 4. In a preferable embodiment, $m^1$ to $m^4$ are the same, $m^5$ to $m^8$ are the same, $n^1$ to $n^4$ are the same, and $n^5$ to $n^8$ are the same. In another embodiment, $m^1$ to $m^8$ are each 1, and $n^1$ to $n^8$ are each 0 or 1.

(Use)

The polyaniline obtained by using the producing method according to the present invention can be used for a variety of uses that are conventionally and publicly known as the uses of a conductive polyaniline. Specifically, for example, the polyaniline can be used as an antistatic agent.

(Antistatic Agent)

As to a method for using the polyaniline obtained by using the producing method according to the present invention for an antistatic agent, a variety of publicly known methods in which a conventional conductive polyaniline is used for an antistatic agent can be applied. For example, when water or other appropriate solvents in which the polyaniline obtained by using the producing method according to the present invention is dissolved or dispersed is coated on a substrate, an antistatic action is given to the surface of the substrate. As to the substrate, any solid substrates desired to have an antistatic action are included. Specific examples include, for example, polymeric films, polymeric fiber, polymeric resin molded products and the like.

As to a coating method, any methods used as a method for coating a conventional polyaniline on a substrate can be used for the polyaniline obtained by using the producing method according to the present invention. Specific examples include, for example, spin coating, dip coating and the like.

EXAMPLES

Hereinafter, Examples will be listed to describe the present invention, but it should be noted that the present invention will not be limited by these Examples at all.

(Method for Measuring Conductivity)

Conductivity of the polyaniline obtained by using the producing method according to the present invention was confirmed by measuring its electric conductivity using the method described below.

(Making of Test Piece)

Examples 1A, 2, 3A: a thin film of 10 mg/mL aqueous solution of a polyaniline to be measured was made using a drop casting method on slits of a substrate described below, followed by drying with warm wind.

Examples 1B, 3B, 3C: 0.0025 mmol pyridine was added to 1 mg of the resulting polyaniline, and water was further added thereto to form a 1% aqueous solution, a thin film was made on slits of the substrate described below using a drop casting method, followed by drying with warm wind.

Substrate: ITO substrate having a thickness of 150 nm with slits having a width of 200 μm made by film-forming on a glass substrate of 5 mm in length×30 mm in width (Measurement of Electric Conductivity)

Electric conductivity was measured using an insulation resistance tester (CX-180N available from CUSTOM) and using a two-terminal method.

Synthesis Example 1

Synthesis Example 1A

Synthesis of 3-nitrophenylphosphonic acid 10.0 g phenylphosphonic acid (0.064 mol) and 40.8 mL 98% sulfuric acid were put in a flask, and it was completely dissolved. It was cooled to 5° C. Then, while it was being stirred, mixed liquid of 4.0 mL 98% sulfuric acid and 5.2 mL 60% nitric acid (0.068 mol) was added by dripping little by little. The temperature during the dripping was maintained from 5 to 10° C., and the dripping time was 40 minutes. Then, reaction was further continued for 2 hours at 3° C. Then, 100 g water was slowly added to precipitate a solid. The solid was separated by filtration with a Kiriyama funnel, followed by drying under reduced pressure of 133 Pa at 40° C., and thus 11.58 g (0.057 mol, 89% yield) 3-nitrophenylphosphonic acid which was a white and plate-formed solid was obtained. No further purification was performed. No further treatment was performed and the product was used for the next reaction.

The $^1$H-NMR measurement result of the resulting 3-nitrophenylphosphonic acid is described below.

$^1$H-NMR (D$_2$O, 400 MHz): δ7.71-7.76 (1H, m), 8.09-8.15 (1H, m), 8.37-8.39 (1H, m), 8.54-8.58 (1H, m).

Synthesis Example 1B

Synthesis of 3-aminophenylphosphonic acid

After the inside of the flask was dried, 1.25 g 3-nitrophosphonic acid (6.15 mmol) was put therein in a nitrogen atmosphere. Next, 160 mg 5% Pd—C was put therein, and 5 mL methanol was added therein. It was stirred at a room temperature, and the atmosphere within the system was changed to a hydrogen atmosphere. Two hours later, 5 mL methanol was further added. The reaction was allowed to proceed further for five hours. After the reaction ended, separation by filtration was performed with Celite, and the filtrate was distilled to remove the solvent. Drying was performed under reduced pressure of 133 Pa and at a room temperature, and thus 527 mg 3-aminophenylphosphonic acid (3.04 mmol, 49% yield) which was a brown colored liquid was obtained. No further purification was performed. No further treatment was performed and the product was used for the next reaction.

The $^1$H-NMR measurement result of the resulting 3-aminophenylphosphonic acid is described below.

$^1$H-NMR (D$_2$O, 400 MHz): δ7.52-7.54 (1H, m), 7.61-7.66 (1H, m), 7.69-7.73 (1H, m), 7.80-7.85 (1H, m).

Example 1A

Synthesis of poly(aniline-2-phosphonic acid)

100 mg 3-aminophenylphosphonic acid (0.58 mmol) and 1.16 mL water were put into a flask, 1.16 mL 1M-NH$_3$ aqueous solution (1.16 mmol) was added therein, and the mixture was cooled to 5° C. while being stirred, and 0.58 ml, 1.25M-(NH$_4$)$_2$S$_2$O$_8$ aqueous solution (0.73 mmol) was dripped over 30 minutes. The resulting mixture was further retained at 5° C. for 24 hours, and the reaction was completed. The resulting reaction mixture was added in 50 mL acetone to precipitate a solid. Stirring was performed for 30 minutes at a room temperature, and then the solid was separated by filtration with a Kiriyama funnel, followed by washing with several mL methanol. The resulting solid was dried under reduced pressure of 133 Pa at 40° C., thus a 95 mg green-color solid was obtained.

Conductivity of the resulting crude poly(aniline-2-phosphonic acid) product was measured using the method described in the "Method for Measuring Conductivity" described above. The results are described in Table 1.
(Purification and Ion Exchange Operation)

95 mg of the crude product described above was dissolved into 1 mL water, which was allowed to go through a gel filtration column (PD-10 available from GE Healthcare Japan). Then, 0.1 g ion exchange resin (Amberlite 200CT available from Organo corporation) was added, followed by shaking for 1 hour by a shaker, and thereafter, operations for removing the solid material by filtration were repeated three times. The resulting aqueous solution was dewatered using a rotary evaporator, and thus 45 mg solid was obtained. Conductivity of the obtained poly(aniline-2-phosphonic acid) was measured using the method described in the "(Method for Measuring Conductivity)" described above. The results are described in Table 1.

Figure 2:
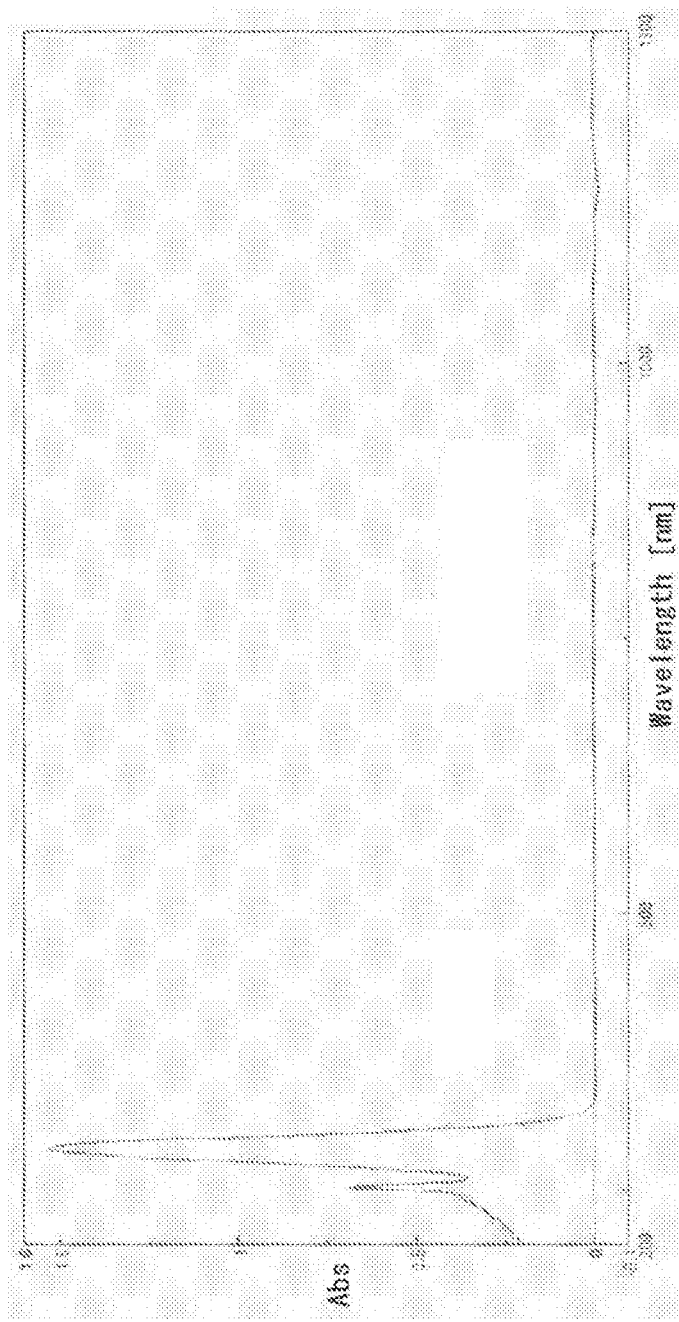
FIG. 2 shows a UV-Vis-NIR spectrum (solvent: pH9 borate buffer, 0.1 mg/mL concentration) of 3-aminophenylphosphonic acid.
Figure 3:
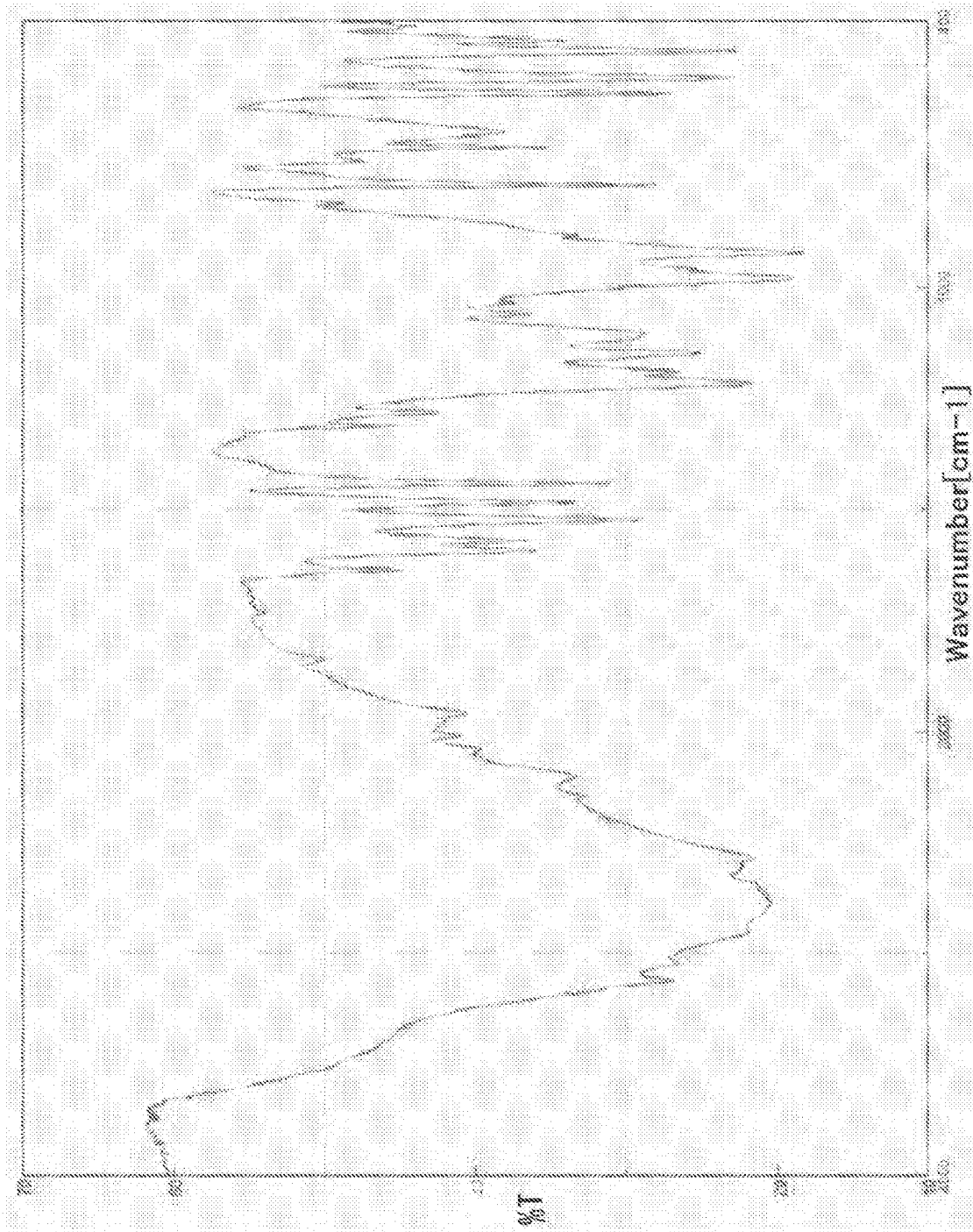
FIG. 3 shows a FT-IR spectrum (KBr method) of 2-aminophenylphosphonic acid hydrochloride salt.
Figure 7:
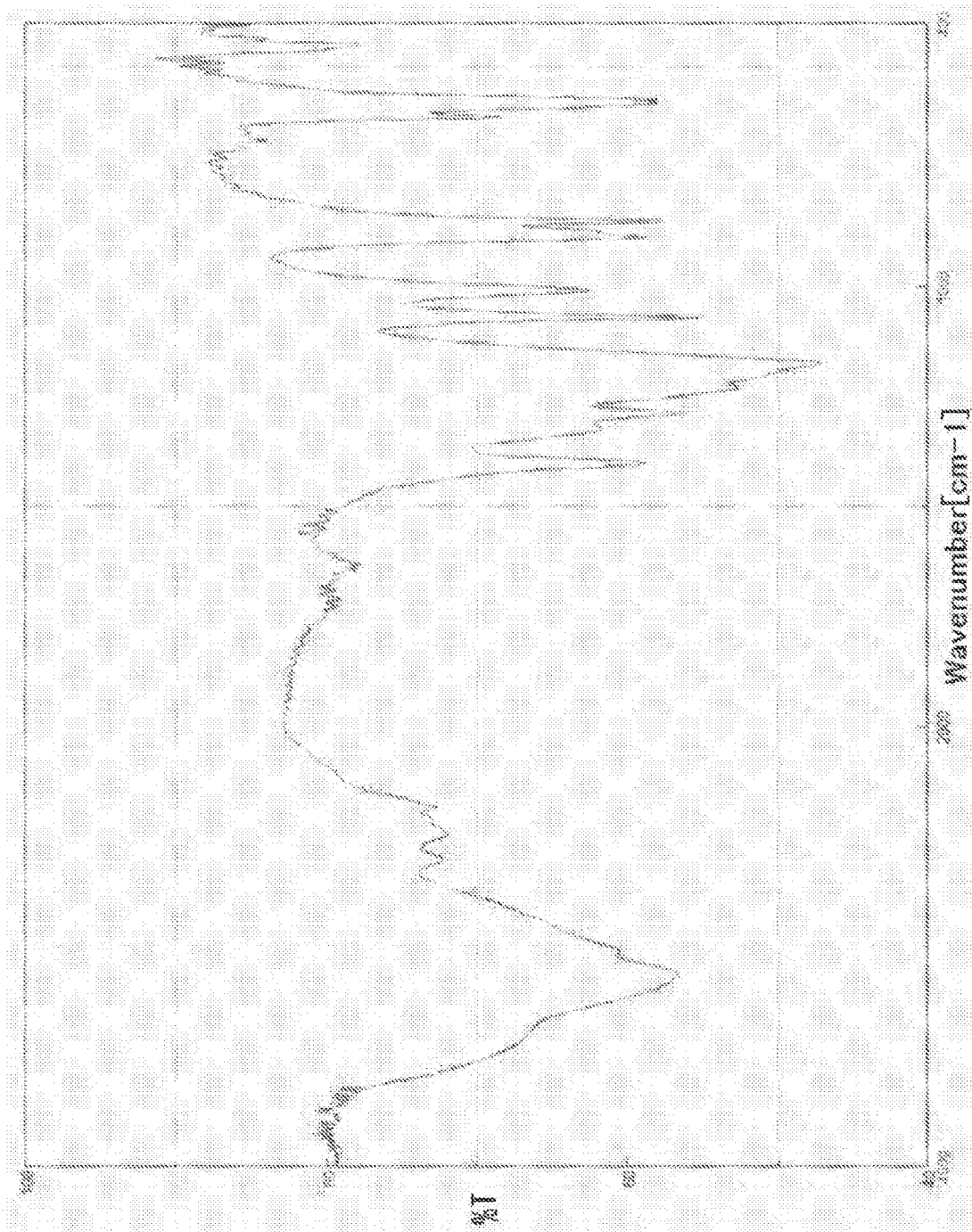
FIG. 7 shows a FT-IR spectrum (KBr method) after purification of Example 1A.
Figure 8:
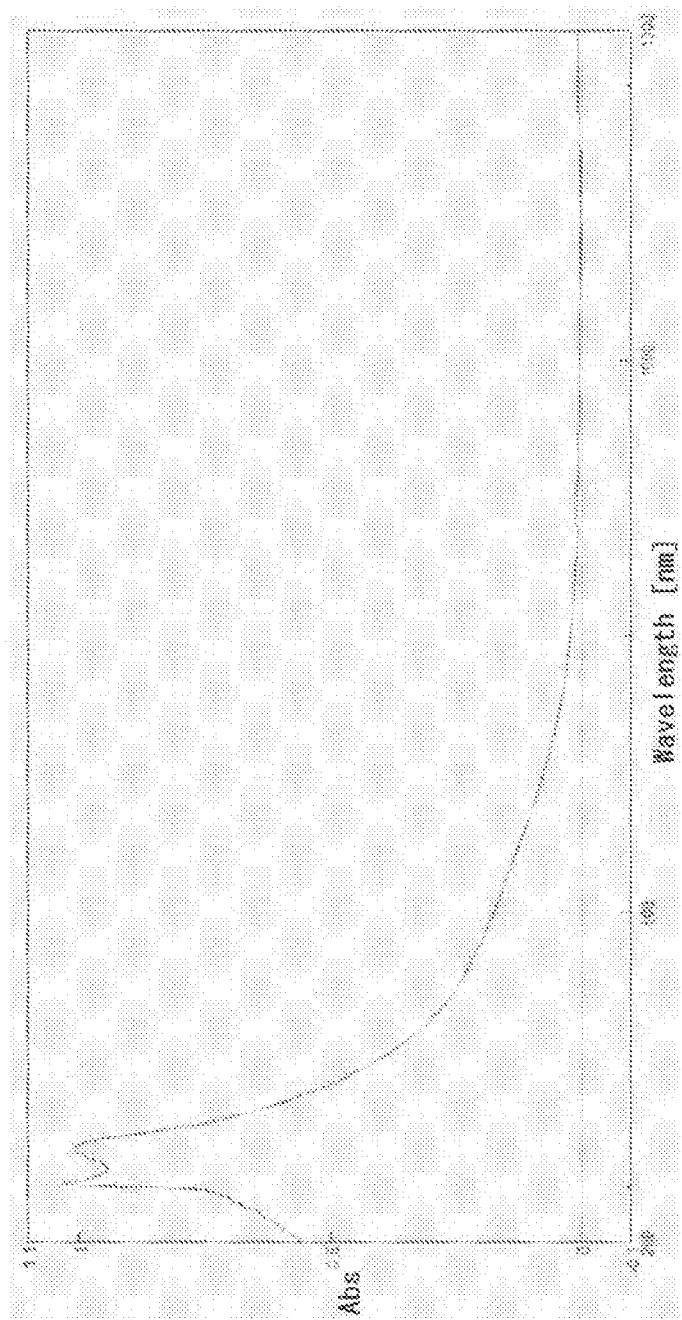
FIG. 8 shows a UV-Vis-NIR spectrum (solvent: pH9 borate buffer, 0.1 mg/mL, concentration) after purification of Example 1A.

In addition, the resulting polymer substance was confirmed with FT-IR spectrum (FIG. 7) and UV-Vis-NIR spectrum (FIG. 8). From the UV-Vis-NIR spectrum, absorption was confirmed also in a longer-wavelength region in comparison with 3-aminophenylphosphonic acid (FIG. 2) which is the raw material, and it was confirmed that the raw material was polymerized and a polymer was obtained.

Example 1B

Synthesis of poly(aniline-2-phosphonic acid)

260 mg 3-aminophenylphosphonic acid (1.50 mmol) and 2.4 mL 2.5M pyridine water (6.00 mmol) were put in a flask and it was dissolved. After cooling down to 0° C., an aqueous solution obtained by dissolving 428 mg (NH$_4$)$_2$S$_2$O$_8$ (1.89 mmol) in 1.67 mL water was dripped over 1 hour. The mixture was further stirred at 0° C. for 93 hours, and the reaction was completed.
(Purification and Ion Exchange Operations)

7 mL 1M hydrochloric acid was added to the resulting reaction product followed by stirring lightly for about 60 seconds, and then, it was separated into a solid and liquid using a centrifugal separator. After supernatant was removed, 6 mL 1M hydrochloric acid was added to the solid, followed by stirring lightly for about 60 seconds, and then, it was separated into a solid and liquid using a centrifugal separator. Similar supernatant removal, hydrochloric acid addition and stirring, and centrifugation operations were further performed 4 times. Then, the resulting solid material was dried under reduced pressure of 133 Pa at 40° C., and thus a 123 mg solid was obtained. Conductivity of the resulting poly(aniline-2-phosphonic acid) was measured using the method described in the "(Method for Measuring Conductivity)" described above. The results are described in Table 1.

Figure 9:
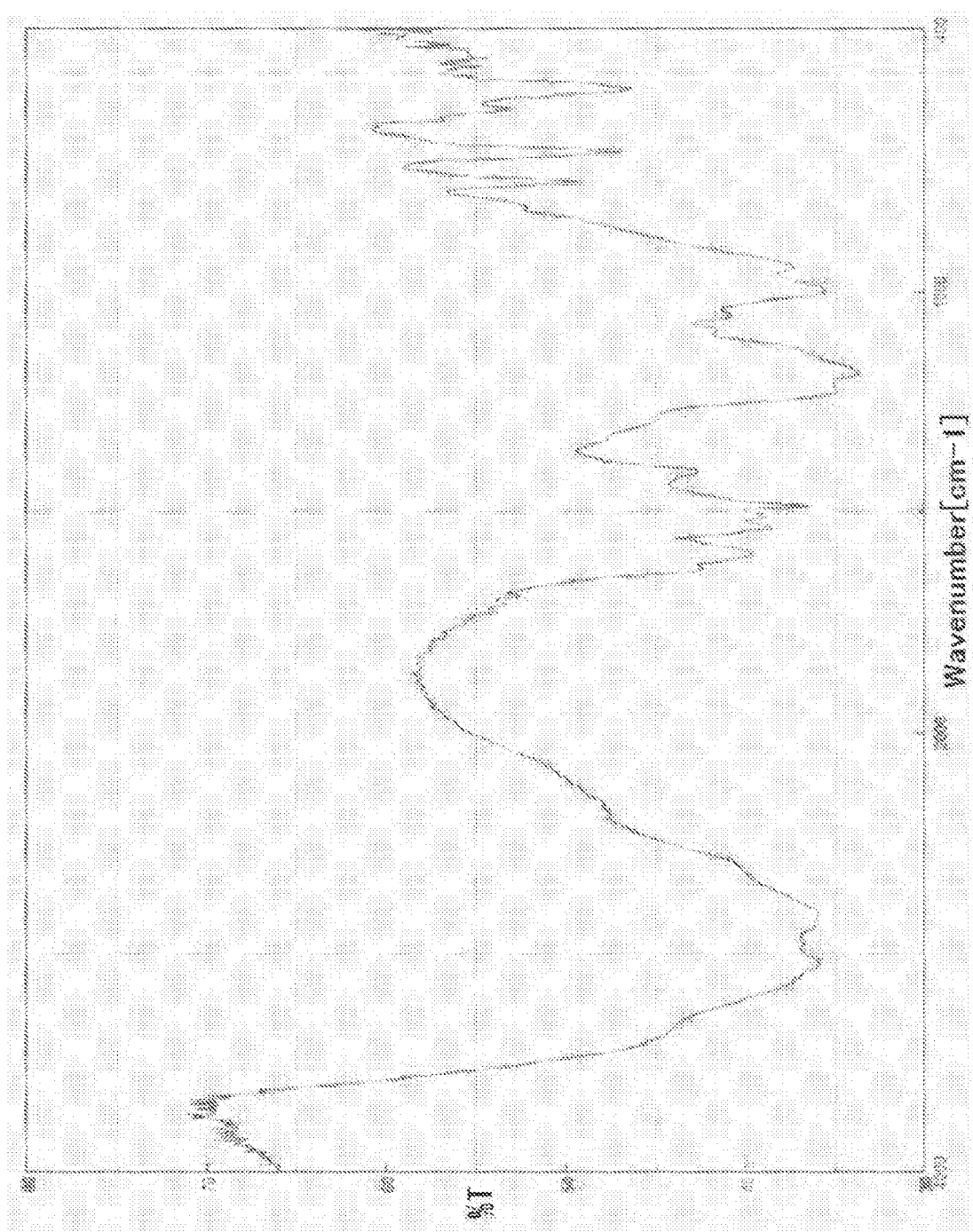
FIG. 9 shows a FT-IR spectrum (KBr method) after purification of Example 1B.
Figure 10:
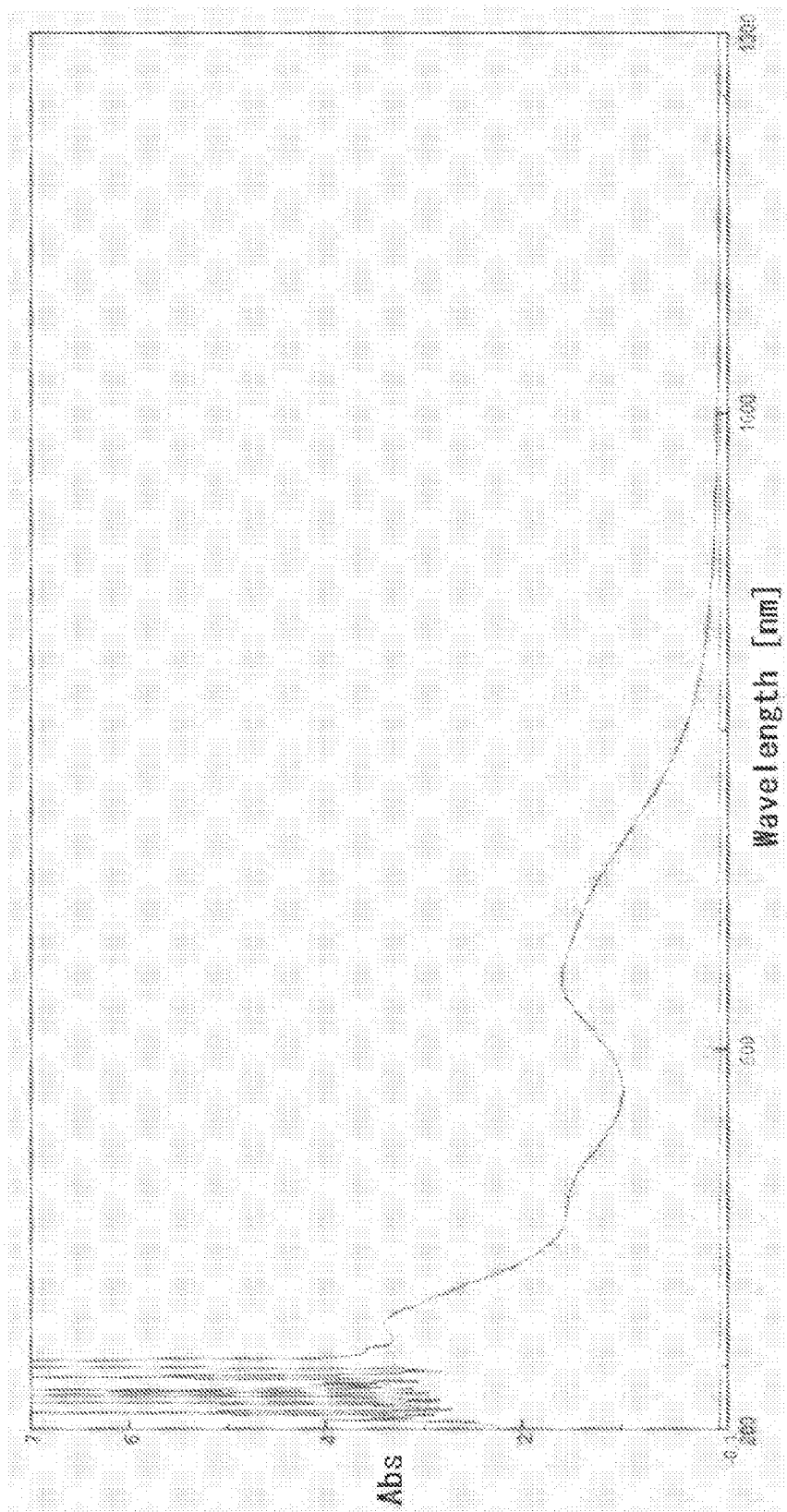
FIG. 10 shows a UV-Vis-NIR spectrum (solvent: pH9 borate buffer, 0.1 mg/mL concentration) after purification of Example 1B.

In addition, the resulting polymer substance was confirmed with FT-IR spectrum (FIG. 9) and UV-Vis-NIR spectrum (FIG. 10). From UV-Vis-NIR spectrum, absorption was confirmed also in a longer-wavelength region in comparison with 3-aminophenylphosphonic acid (FIG. 2) which is the raw material, and it was confirmed that the raw material was polymerized and a polymer was obtained.

Synthesis Example 2

Synthesis Example 2A

Synthesis of diethyl(2-aminophenyl)phosphonate

The inside of a flask was dried, and then, in a nitrogen atmosphere, 407 mg Na$_2$CO$_3$ (3.84 mmol), 78 mg Pd(OAc)$_2$ (0.35 mmol), 0.38 mL 2-bromoaniline (3.49 mmol), 0.9 mL diethyl phosphite (6.99 mmol), and 3 mL xylene were put therein. The mixture was stirred at 120° C. for 17 hours, and then, it was cooled to the room temperature. Then a solid material was separated by filtration with Celite, and the filter residue was washed with CH$_2$Cl$_2$. The resulting filtrate and the washing liquid of the filter residue were mixed with each other, followed by distillation and removal of the solvent. Then, purification was performed using column chromatography, and thus 840 mg yellow-colored liquid was obtained. Then, Kugelrohr distillation (100° C./133 Pa×20 minutes) was performed to distil away residual diethyl phosphite, and 653 mg diethyl(2-aminophenyl)phosphonate (2.85 mmol, 82% yield) which was a yellow-colored liquid was obtained.

$^1$H-NMR measurement results of the resulting diethyl(2-aminophenyl)phosphonate are described below.

$^1$H-NMR (CDCl$_3$, 400 MHz): δ1.32 (6H, t, J=6.9 Hz), 4.00-4.21 (4H, m), 5.15 (2H, brs), 6.63-6.72 (2H, m), 7.24-7.29 (1H, m), 7.44 (1H, ddd, J=14.5, 7.8, 1.4 Hz).

Synthesis Example 23

Synthesis of 2-aminophenylphosphonic acid hydrochloride salt 2.29 g diethyl(2-aminophenyl)phosphonate (10 mmol) was put in a flask, followed by cooling in an ice bath, and then 6.3 mL 35% hydrochloric acid (75 mmol) was added therein. The resulting mixed solution was stirred at 85° C.

for 7 hours, and then the temperature was raised to 100° C., and it was retained for 1 hour. The resulting reaction solution was cooled down to the room temperature, and toluene was added and the distillation and removal of solvent were performed. The resulting solid material was dried under reduced pressure of 133 Pa and at the room temperature, and thus 2.04 g solid of 2-aminophenylphosphonic acid hydrochloride salt (9.74 mmol, 97% yield) was obtained.

$^1$H-NMR measurement results of the resulting 2-aminophenylphosphonic acid hydrochloride salt are described below. $^1$H-NMR (D$_2$O, 400 MHz): δ7.41-7.45 (1H, m), 7.53-7.69 (2H, m), 7.84 (1H, ddd, J=13.4, 7.8, 1.4 Hz).

Example 2

Synthesis of poly(aniline-2-phosphonic acid)

173 mg 2-aminophenylphosphonic acid hydrochloride salt (0.83 mmol) and 2.00 mL water were put in a flask, and 2.00 mL 1M-NH$_3$ aqueous solution (2.00 mmol) was added therein. It was stirred and cooled down to 5° C., and then, 1.00 mL 1.25M-(NH$_4$)$_2$S$_2$O$_8$ aqueous solution (1.25 mmol) was dripped over 30 minutes. The resulting mixture was further retained at 5° C. for 24 hours, and the reaction was completed. The resulting reaction mixture was added to 50 mL acetone to precipitate a solid. Stirring was performed at the room temperature for 30 minutes, and then the solid was separated by filtration with a Kiriyama funnel, followed by washing with several mL methanol. The resulting solid material wad dried under reduced pressure of 133 Pa and at 40° C., and thus a 197 mg green-colored solid was obtained.

Conductivity of the resulting crude poly(aniline-2-phosphonic acid) product was measured using the method described in the "(Method for Measuring Conductivity)" described above. The results are described in Table 1.
(Purification and Ion Exchange Operations)

Operations similar to the purification operations of Example 1A were performed on 150 mg of the crude product described above, and thus a 105 mg solid was obtained. Conductivity of the resulting poly(aniline-2-phosphonic acid) was measured using the method described in the "(Method for Measuring Conductivity)" described above. The results are described in Table 1.

Figure 4:
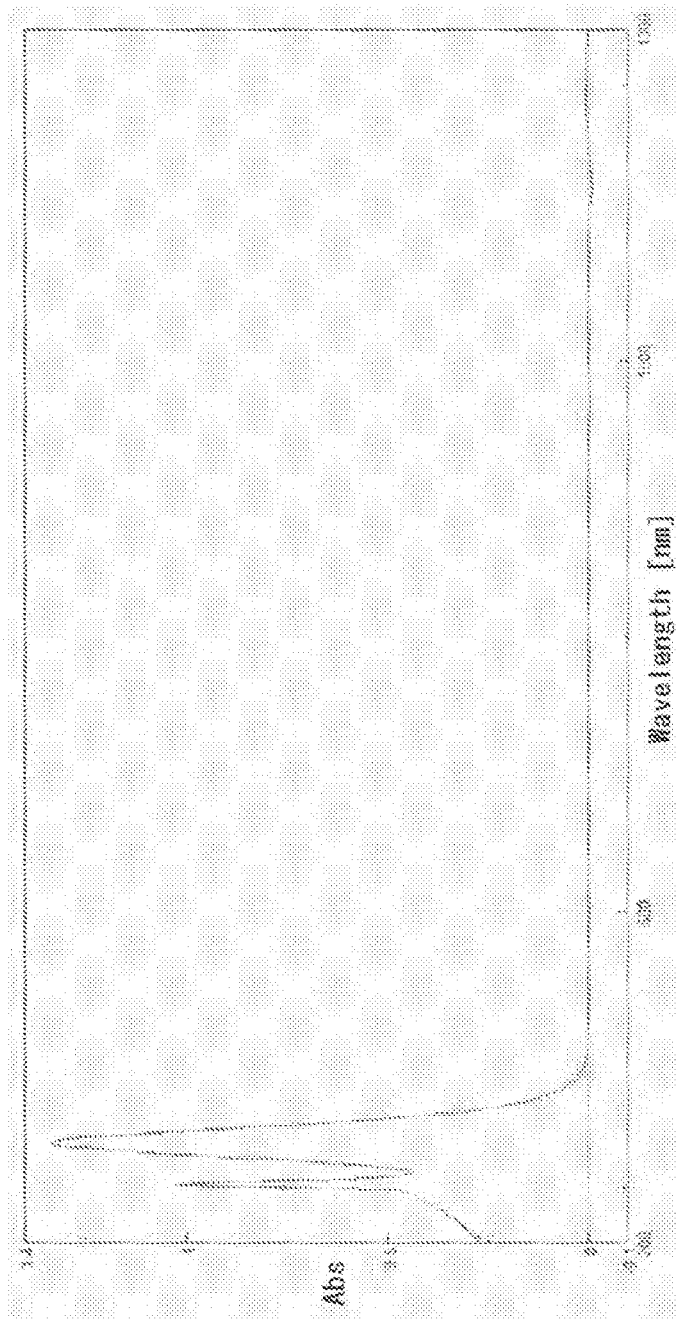
FIG. 4 shows a UV-Vis-NIR spectrum (solvent: pH9 borate buffer, 0.1 mg/mL concentration) of 2-aminophenylphosphonic acid hydrochloride salt.
Figure 5:
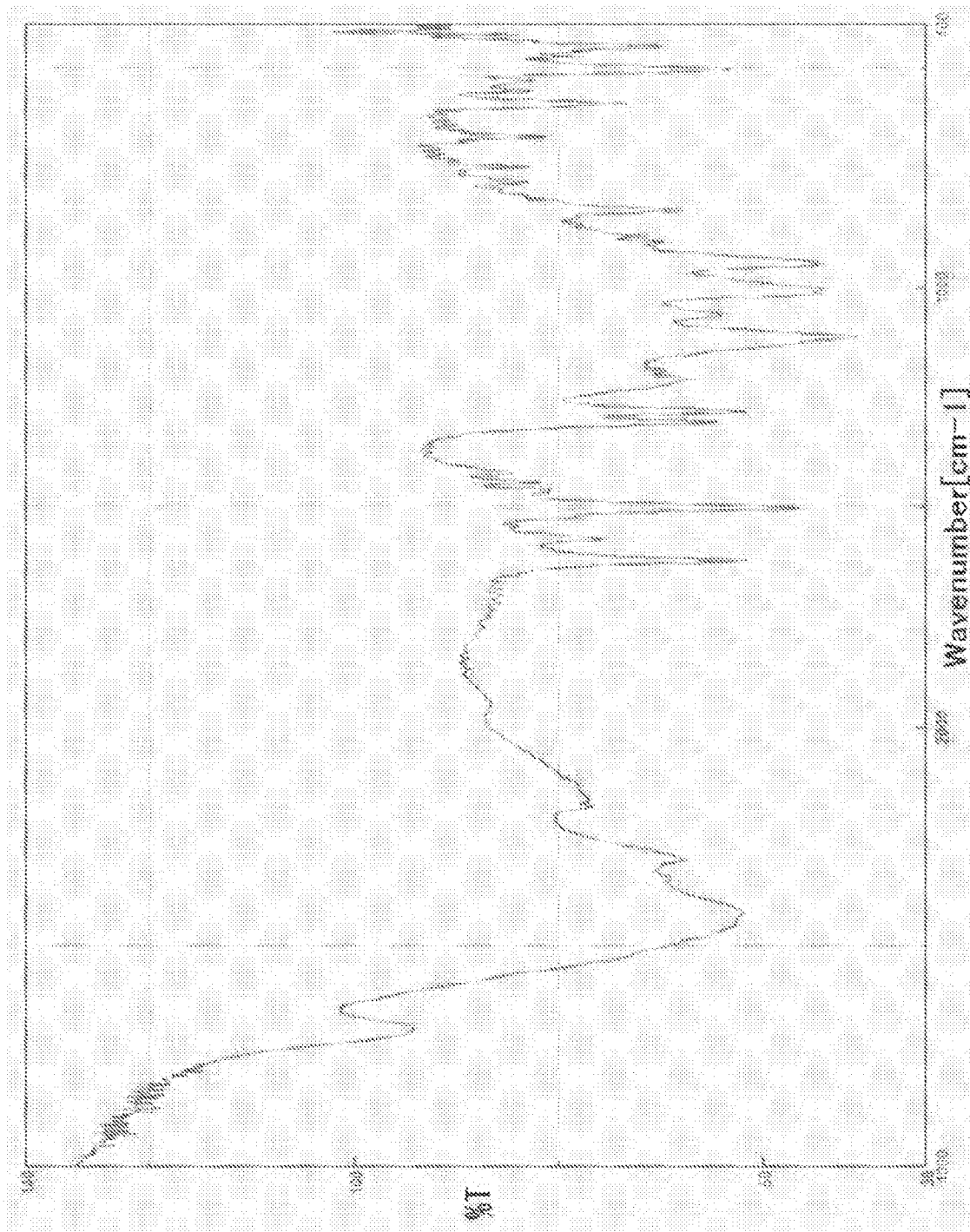
FIG. 5 shows a FT-IR spectrum (KBr method) 3-amino-4-methoxyphenylphosphonic acid hydrochloride salt.
Figure 11:
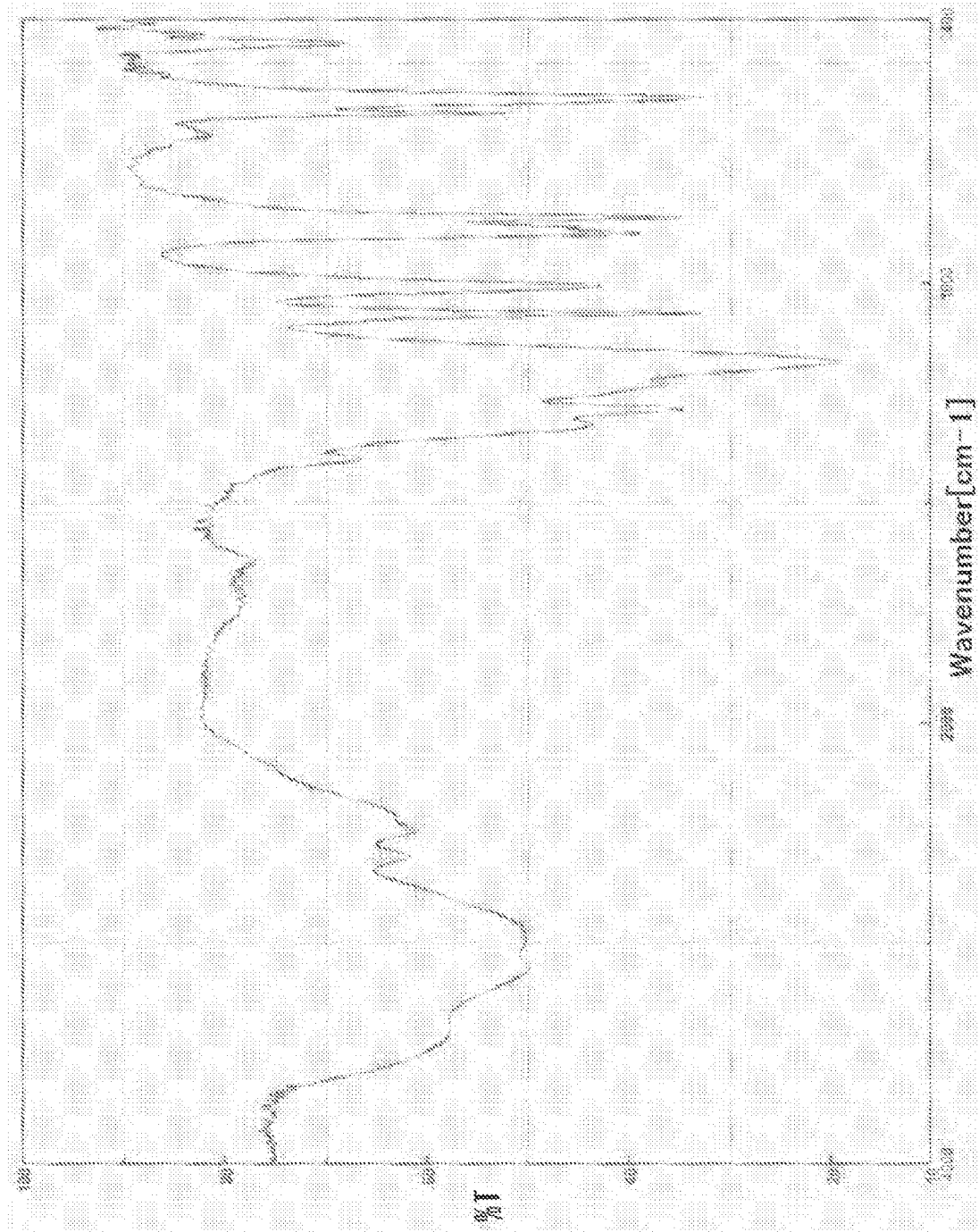
FIG. 11 shows a FT-IR spectrum (KBr method) after purification of Example 2.
Figure 12:
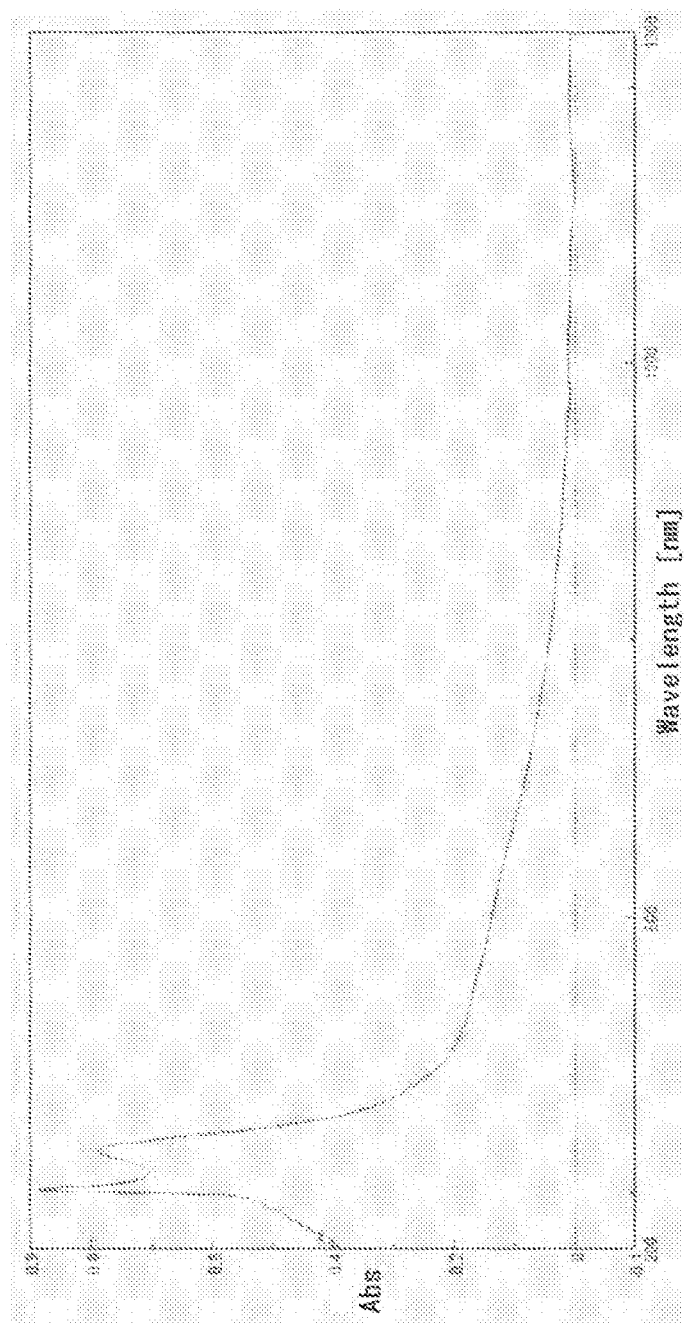
FIG. 12 shows a UV-Vis-NIR spectrum (solvent: pH9 borate buffer, 0.1 mg/mL, concentration) after purification of Example 2.

In addition, the resulting polymer substance was confirmed with FT-IR spectrum (FIG. 11) and UV-Vis-NIR spectrum (FIG. 12). From UV-Vis-NIR spectrum, absorption was confirmed also in a longer-wavelength region in comparison with 2-aminophenylphosphonic acid hydrochloride salt (FIG. 4) which is the raw material, and it was confirmed that the raw material was polymerized and a polymer was obtained.

Synthesis Example 3

Synthesis Example 3A

Synthesis of diethyl(4-methoxy-3-nitrophenyl)phosphonate

The inside of the flask was dried, and then, in a nitrogen atmosphere, 804 mg 4-bromo-2-nitro anisole (3.47 mmol), 405 mg Na$_2$CO$_3$ (3.82 mmol), 78 mg Pd(OAc)$_2$ (0.35 mmol), 0.9 mL diethyl phosphite (6.99 mmol), and 3 mL xylene were put therein. The mixture was stirred at 120° C. for 24 hours, and was cooled down to the room temperature, and then, the solid material was filtered with Celite, and the filter residue was washed with CH$_2$Cl$_2$. The resulting filtrate and the washing liquid of the filter residue were mixed with each other, followed by removing the solvent. Then, purification was performed using column chromatography, and thus 807 mg yellow-colored liquid was obtained. Then, Kugelrohr distillation (100° C./133 Pa×30 minutes) was performed to distil away residual diethyl phosphite, and 689 mg diethyl(4-methoxy-3-nitrophenyl)phosphonate (2.38 mmol, 69% yield) which was the yellow-colored liquid was obtained.

Measurement results of $^1$H-NMR, $^{31}$P-NMR, HRMS and FT-IR of the resulting diethyl(4-methoxy-3-nitrophenyl) phosphonate are described below.
$^1$H-NMR (CDCl$_3$, 400 MHz): δ1.30 (6H, t, J=6.9 Hz), 3.98 (3H, s), 4.01-4.19 (4H, m), 7.16 (1H, dd, J=8.5, 3.2 Hz), 7.92-7.98 (1H, m), 8.19 (1H, brd, J=13.3 Hz).
$^{13}$C-NMR (CDCl$_3$, 100 MHz): δ16.22 (d, J=6.7 Hz), 56.70, 62.46 (d, J=4.8 Hz), 113.49 (d, J=15.3 Hz), 120.73 (d, J=198.4 Hz), 129.13 (d, J=12.5 Hz), 137.50 (d, J=10.5 Hz), 139.45 (d, J=18.2 Hz), 155.53 (d, J=2.9 Hz). $^{31}$P-NMR (CDCl$_3$, 162 MHz): δ16.33.

HRMS (FAB): m/z 290.0789 ([M+H]$^+$, C$_{11}$H$_{17}$NO$_6$P$^+$ calcd. 290.0788).

FT-IR (ATR): 2984, 2907, 1610, 1531, 1247, 1012, 960 cm$^{-1}$.

Synthesis Example 3B

Synthesis of diethyl(3-amino-4-methoxyphenyl)phosphonate

The inside of the flask was dried, and then, in a nitrogen atmosphere, 1.14 g diethyl(4-methoxy-3-nitrophenyl)phosphonate (3.9 mmol) and 5 mL methanol were added therein, and 88 mg 5% Pd—C was added therein. Then, stirring was performed at the room temperature, and inside the system was changed to a hydrogen atmosphere. 4.5 hours later, 5% Pd—C was further added, stirring was performed for 2 hours at the room temperature, and the reaction was completed. The resulting reaction mixture was separated by filtration with Celite, and the filtrate was distilled to remove the solvent. As a result, 830 mg diethyl(3-amino-4-methoxyphenyl)phosphonate which was a brown-colored liquid was obtained.

Measurement results of $^1$H-NMR, $^{31}$P-NMR, FIRMS and FT-IR of the resulting diethyl(3-amino-4-methoxyphenyl) phosphonate are described below.
$^1$H-NMR (CD$_2$Cl$_2$, 400 MHz): δ1.26 (6H, t, J=6.9 Hz), 3.82 (2H, brs), 3.86 (3H, s), 3.94-4.06 (4H, m), 6.83 (1H, dd, J=8.2, 4.1 Hz), 7.05 (1H, dd, J=1.8, 13.7 Hz), 7.11 (1H, ddd, J=1.8, 8.2, 13.7 Hz).
$^{13}$C-NMR (CDCl$_3$, 100 MHz): δ16.20 (d, J=6.7 Hz), 55.41, 61.78 (d, J=4.8 Hz), 109.76 (d, J=18.2 Hz), 117.54 (d, J=12.5 Hz), 119.34 (d, J=192.7 Hz), 123.10 (d, J=10.5 Hz), 135.94 (d, J=19.2 Hz), 150.45 (d, J=3.8 Hz).
$^{31}$P-NMR (CD$_2$Cl$_2$, 162 MHz): δ20.47.

HRMS (FAB): m/z260.1045 ([M+H]$^+$, C$_{11}$H$_{19}$NO$_4$P$^+$ calcd. 260.1046).

FT-IR (ATR): 3467, 3329, 2980, 1620, 1584, 1511, 1285, 1223, 1015, 955 cm$^{-1}$.

Synthesis Example 3C

Synthesis of 3-amino-4-methoxyphenylphosphonic acid hydrochloride salt 5 mL 35% hydrochloric acid (60 mmol) was added to the diethyl(3-amino-4-methoxyphenyl)phosphonate obtained in Synthesis Example 3B described above, followed by retaining at 90° C. for 15 hours, and the reaction was completed. The solvent of the resulting reaction mixture was distilled to remove the solvent, and the solid material was dried under reduced pressure of 133 Pa at the room temperature, and thus 672 mg (2.80 mmol, 72% 2-step yield) of a solid of 3-amino-4-methoxyphenylphosphonic acid hydrochloride salt was obtained. No further purification was performed. No further treatment was performed and product was used for the next reaction.

Measurement results of $^1$H-NMR, $^{31}$P-NMR, HRMS and FT-IR of the resulting 3-amino-4-methoxyphenylphosphonic acid hydrochloride salt are described below.

$^1$H-NMR (D$_2$O, 400 MHz): δ3.98 (3H, s), 7.27 (1H, dd, J=8.5, 2.8 Hz), 7.70 (1H, dd, J=12.8, 1.8 Hz), 7.81 (1H, ddd, J=12.8, 8.7, 1.8 Hz).

$^{13}$C-NMR (D$_2$O, 100 MHz): δ57.06, 113.27 (d, J=16.3 Hz), 119.48 (d, J=19.2 Hz), 124.46 (d, J=190.3 Hz), 126.73 (d, J=12.5 Hz), 134.08 (d, J=10.5 Hz), 155.92 (d, J=2.9 Hz).

$^{31}$P-NMR (D$_2$O, 162 MHz): δ13.42.

HRMS (FAB): m/z 204.0422 ([M+H]$^+$, C$_7$H$_{11}$NO$_4$P$^+$ calcd. 204.0420).

FT-IR (KBr): 3359, 2847, 1622, 1502, 1114, 1004, 946 cm$^{-1}$.

mp: 180° C. (decomposed).

Example 3A

Synthesis of poly(2-methoxyaniline-5-phosphonic acid)

150 mg 3-amino-4-methoxyphenylphosphonic acid hydrochloride salt (0.63 mmol) and 1.48 mL water were put in a flask, and 2.96 mL 1M-NH$_3$ aqueous solution (2.96 mmol) was added therein, followed by cooling down to 3° C. Then, 0.74 mL 1.25M-(NH$_4$)$_2$S$_2$O$_8$ aqueous solution (0.93 mmol) was dripped over 30 minutes. The resulting mixture was further stirred at 3° C. for 24 hours, and the reaction was completed. The resulting reaction product was added to 50 mL acetone to precipitate a solid, followed by further stirring at the room temperature for 30 minutes. The solid was separated by filtration with a Kiriyama funnel, followed by washing with several mL methanol. The resulting solid material was dried under reduced pressure of 133 Pa, at 40° C., and thus a 184 mg green-colored solid was obtained.

Conductivity of the resulting crude product of poly(2-methoxyaniline-5-phosphonic acid) was measured using the method described in the "Method for Measuring Conductivity" described above. The results are described in Table 1.

(Purification and Ion Exchange Operations)

Operations similar to the purification operations of Example 1A were performed on 85 mg of the crude product described above, and a 45 mg solid was obtained. Conductivity of the resulting poly(2-methoxyaniline-5-phosphonic acid) was measured using the method described in the "Method for Measuring Conductivity" described above. The results are described in Table 1.

Figure 6:
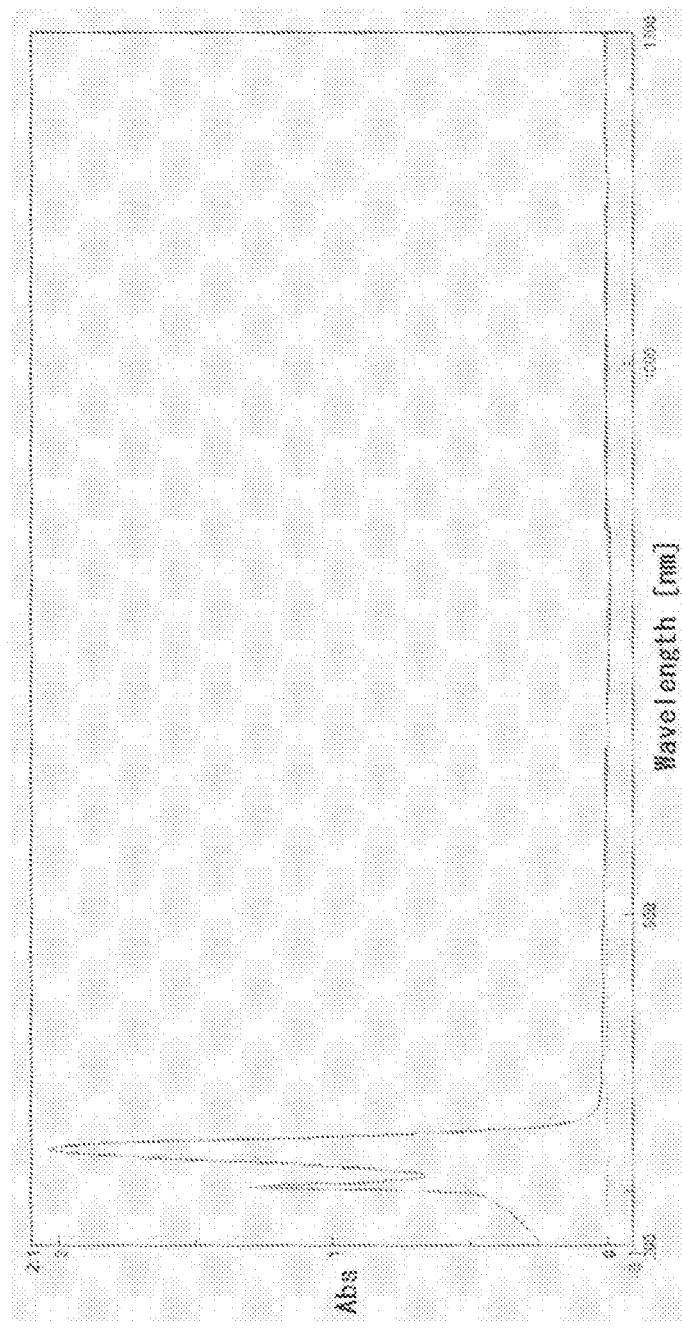
FIG. 6 shows a UV-Vis-NIR spectrum (solvent: pH9 borate buffer, 0.1 mg/mL concentration) of 3-amino-4-methoxyphenylphosphonic acid hydrochloride salt.
Figure 13:
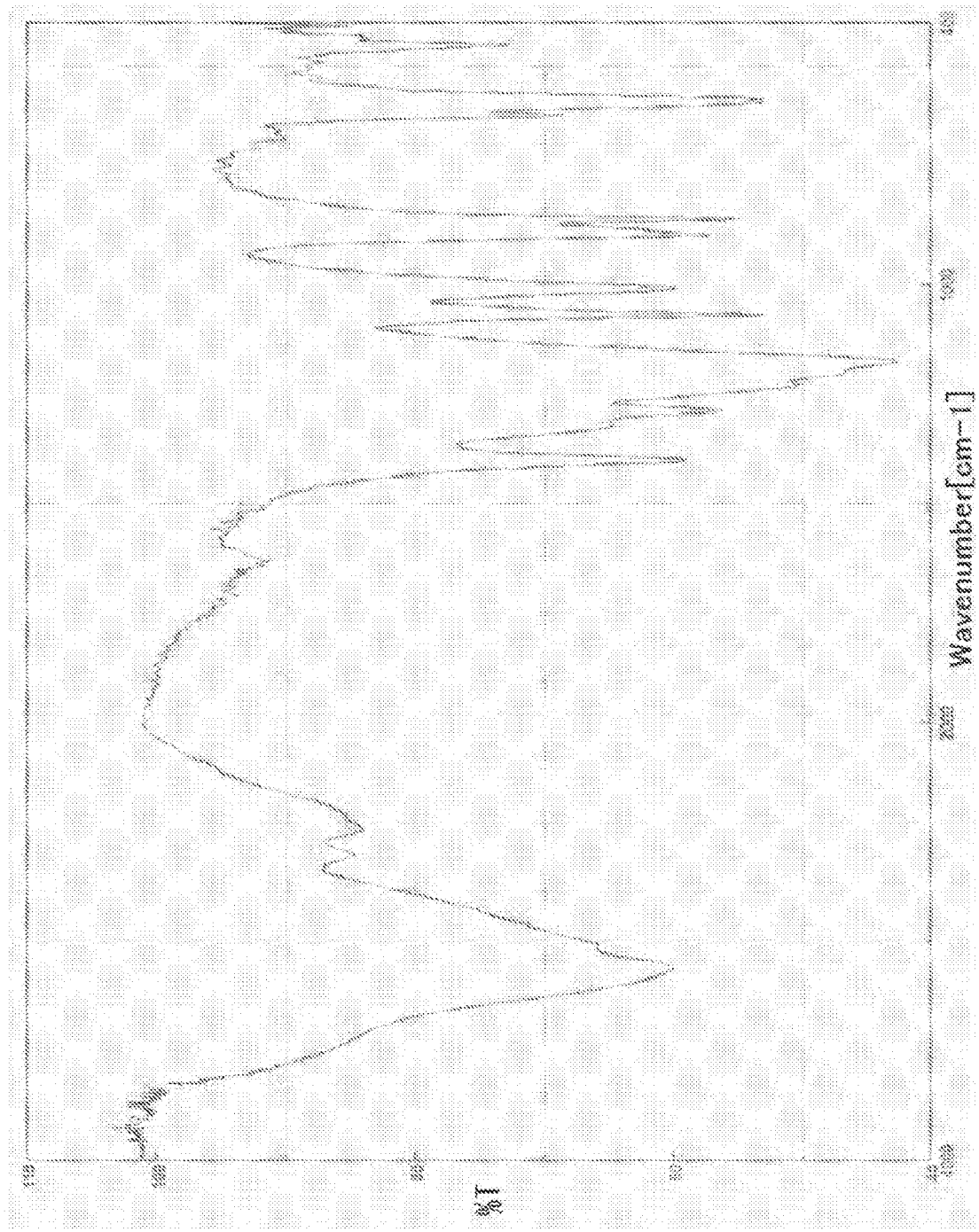
FIG. 13 shows a FT-IR spectrum (KBr method) after purification of Example 3A.
Figure 14:
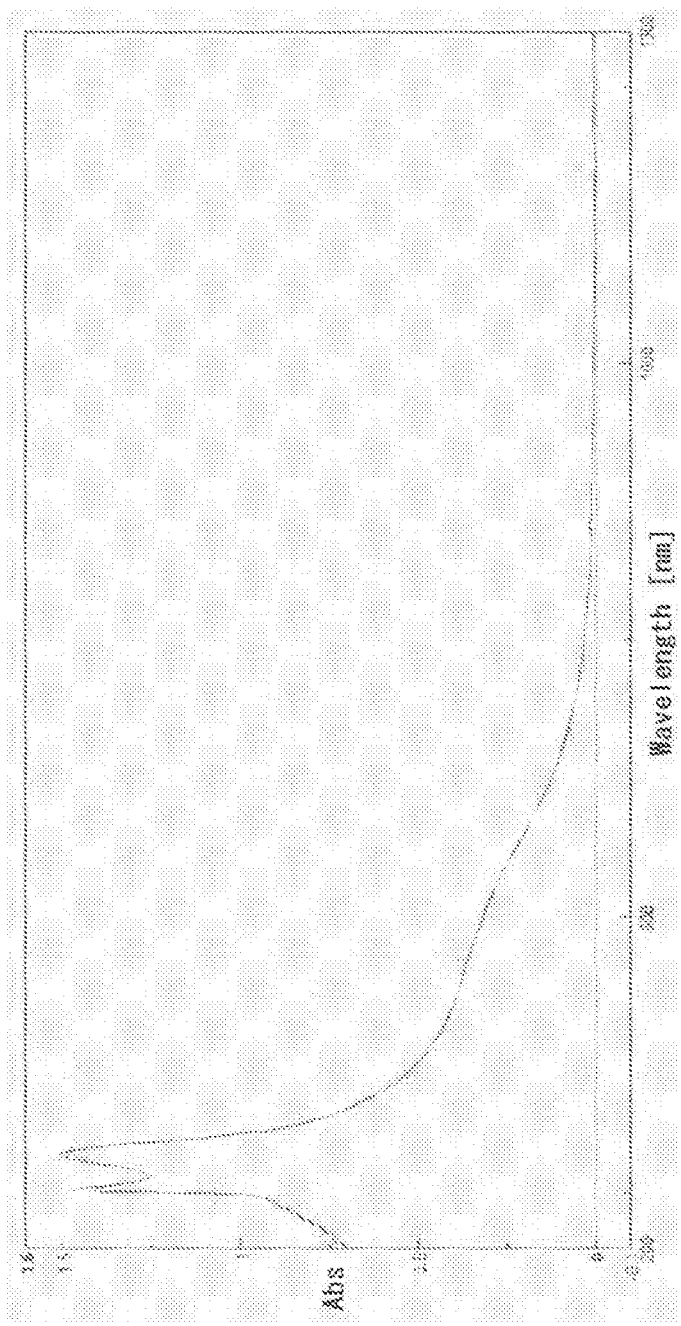
FIG. 14 shows a UV-Vis-NIR spectrum (solvent: pH9 borate buffer, 0.1 mg/mL concentration) after purification of Example 3A.

In addition, the resulting polymer substance was confirmed with FT-IR spectrum (FIG. 13) and UV-Vis-NIR spectrum (FIG. 14). From UV-Vis-NIR spectrum, absorption was confirmed also in a longer-wavelength region in comparison with 3-amino-4-methoxyphenylphosphonic acid hydrochloride salt (FIG. 6) which is the raw material, and it was confirmed that the raw material was polymerized and a polymer was obtained.

Example 3B

Synthesis of poly(2-methoxyaniline-5-phosphonic acid)

300 mg 3-amino-4-methoxyphenylphosphonic acid hydrochloride salt (1.25 mmol) and 1.60 mL 2.5M pyridine water (4.00 mmol) were put in a flask, and it was dissolved. After cooling down to −5° C., an aqueous solution in which 360 mg (NH$_4$)$_2$S$_2$O$_8$ (1.58 mmol) was dissolved in 1.42 mL water was dripped over 1 hour. The mixture was further stirred at −5° C. for 93 hours, and the reaction was completed.

(Purification and Ion Exchange Operations)

8 mL water was added to the resulting reaction product, and a few drops of 1M hydrochloric acid was added thereto to result in pH1, and stirring was performed for 10 minutes. It was separated into a solid and liquid using a centrifugal separator. After supernatant was removed, 4 mL water and 1 mL 1M hydrochloric acid were added to the solid, followed by lightly stirring for about 60 seconds. Then, it was separated into a solid and liquid using a centrifugal separator. Similar supernatant removal, hydrochloric acid addition and stirring, and centrifugation operations were further performed 5 times. Then, the resulting solid material was dried under reduced pressure of 133 Pa, at 40° C., and thus a 46 mg solid was obtained. Conductivity of the resulting poly(2-methoxyaniline-5-phosphonic acid) was measured using the method described in the "Method for Measuring Conductivity" described above. The results are described in Table 1.

Figure 15:
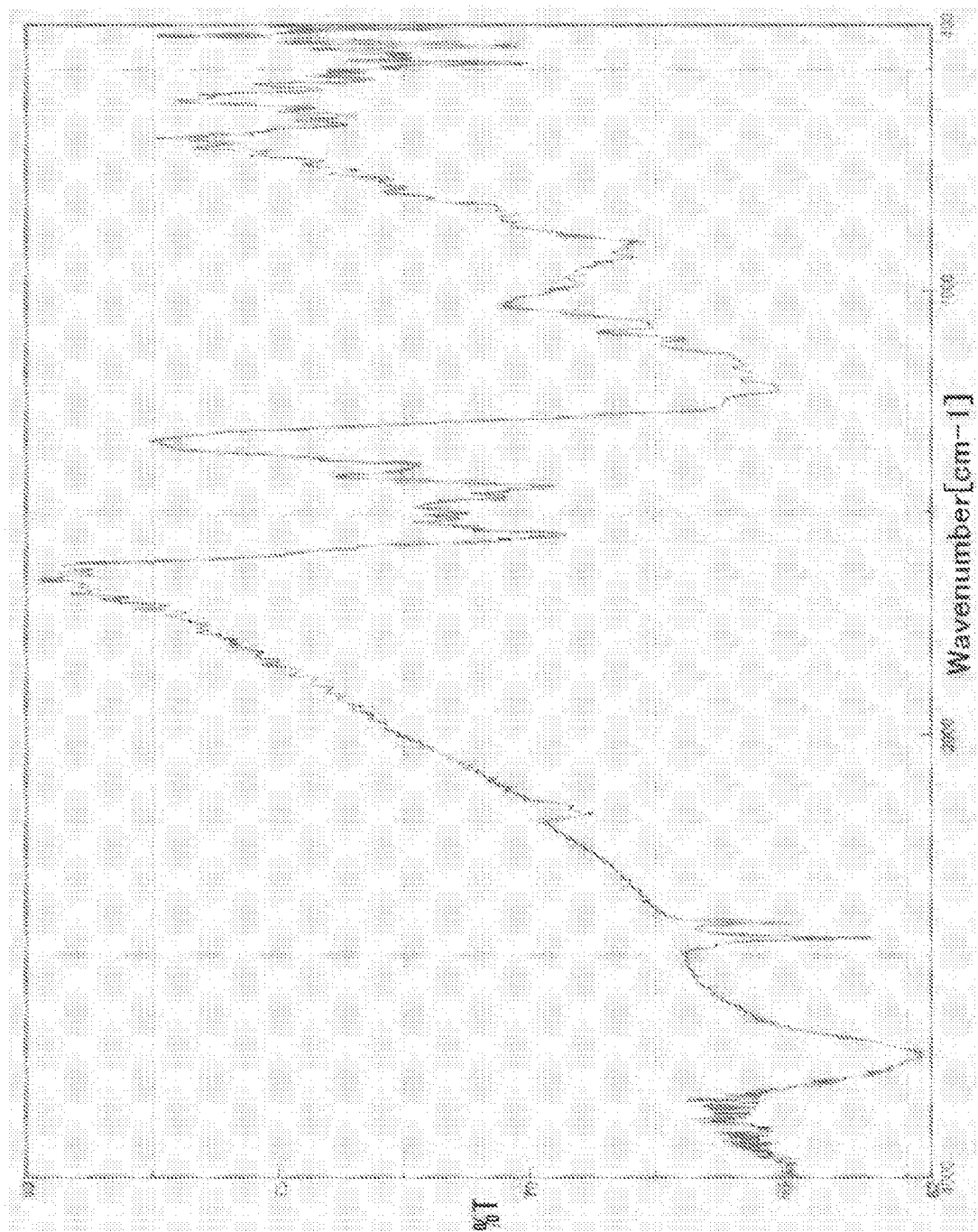
FIG. 15 shows a FT-IR spectrum (KBr method) after purification of Example 35.
Figure 16:
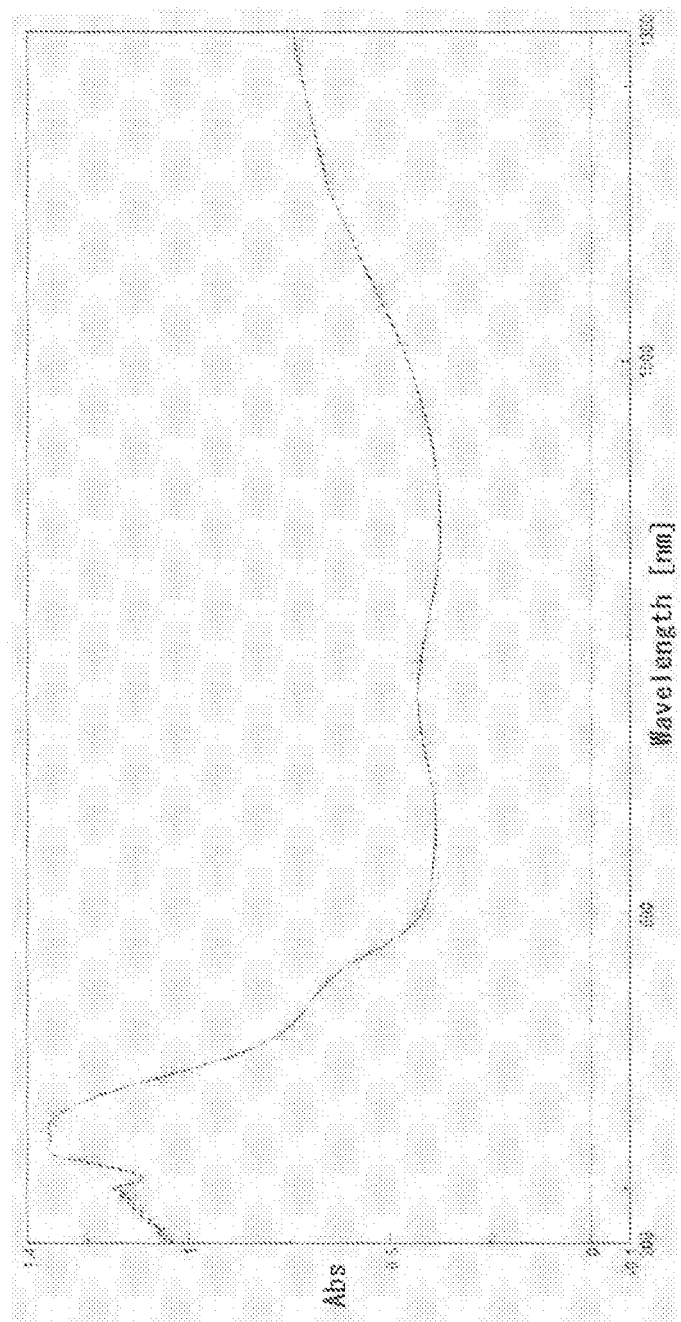
FIG. 16 shows a UV-Vis-NIR spectrum (solvent: pH9 borate buffer, 0.1 mg/mL concentration) after purification of Example 35.

In addition, the resulting polymer substance was confirmed with FT-IR spectrum (FIG. 15) and UV-Vis-NIR spectrum (FIG. 16). From UV-Vis-NIR spectrum, absorption was confirmed also in a longer-wavelength region in comparison with 3-amino-4-methoxyphenylphosphonic acid hydrochloride salt (FIG. 6) which is the raw material, and it was confirmed that the raw material was polymerized and a polymer was obtained. Furthermore, a high value of absorption based on a polaron band was observed at 1000 nm or above, and it was confirmed that a polyaniline having high conductivity was obtained.

Example 3C

Synthesis of poly(2-methoxyaniline-5-phosphonic acid)

100 mg 3-amino-4-methoxyphenylphosphonic acid hydrochloride salt (0.42 mmol) and 0.53 mL 2.5M pyridine water (1.33 mmol) were put in a flask, and it was suspended. After cooling down to −5° C., an aqueous solution in which 120 mg (NH$_4$)$_2$S$_2$O$_8$ (0.53 mmol) was dissolved in 0.47 mL water was dripped over 30 minutes. The mixture was further stirred at −5° C. for 24 hours, and the reaction was completed.

(Purification and Ion Exchange Operations)

3 mL 1M hydrochloric acid was added to the resulting reaction product, followed by lightly stirring for about 60 seconds, and then, it was separated into a solid and liquid using a centrifugal separator. After supernatant was removed, 3 mL 1M hydrochloric acid was added to the solid, followed by lightly stirring for about 60 seconds. Then, it was separated into a solid and liquid using a centrifugal separator. Similar supernatant removal, hydrochloric acid addition and stirring, and centrifugation operations were further performed 4 times. Then, the resulting solid material was dried under reduced pressure of 133 Pa, at 60° C., and thus a 65 mg solid was obtained. Conductivity of the resulting poly(2-methoxyaniline-5-phosphonic acid) was measured using the method described in the "Method for Measuring Conductivity" described above. The results are described in Table 1.

Figure 17:
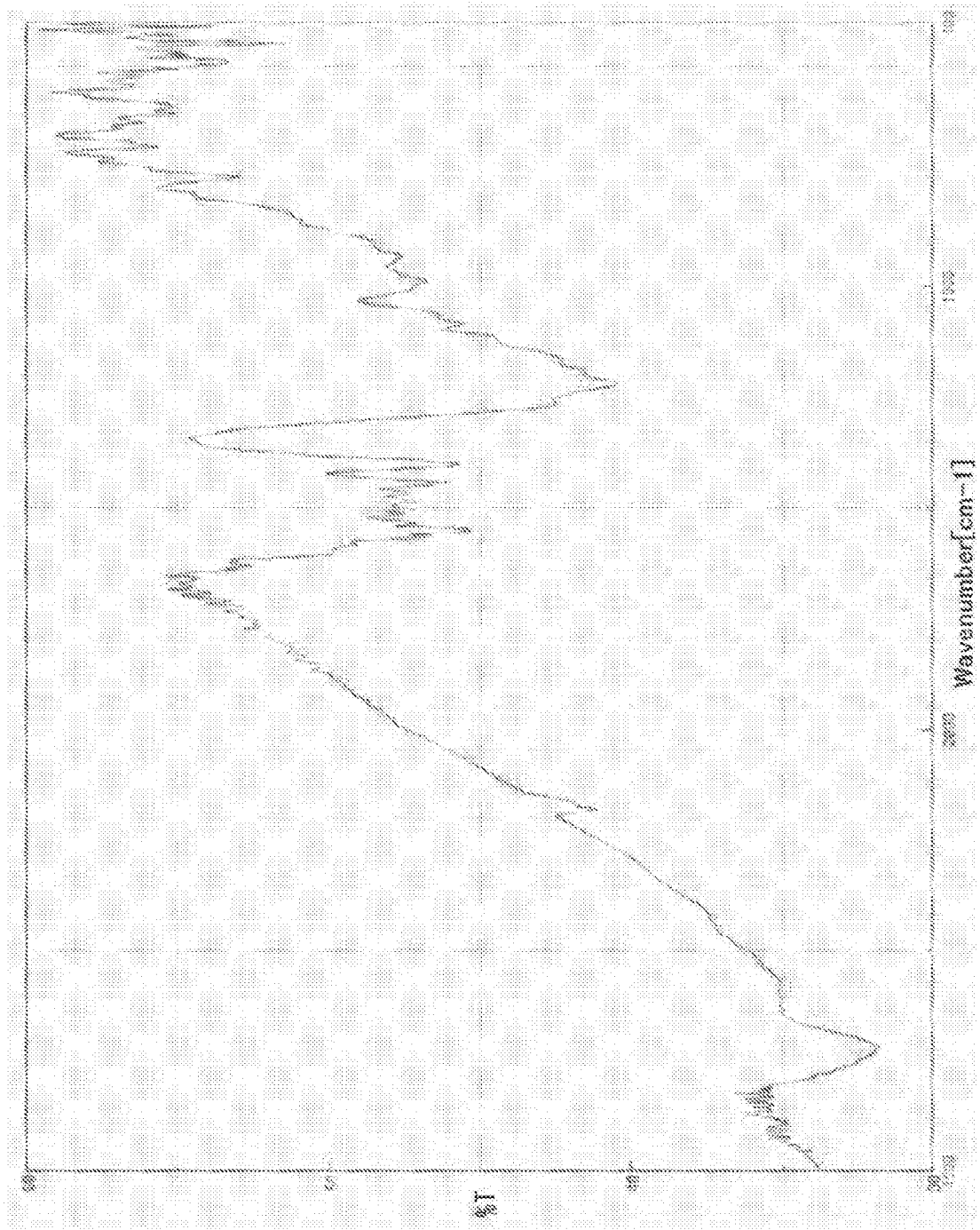
FIG. 17 shows a FT-IR spectrum (KBr method) after purification of Example 3C.
Figure 18:
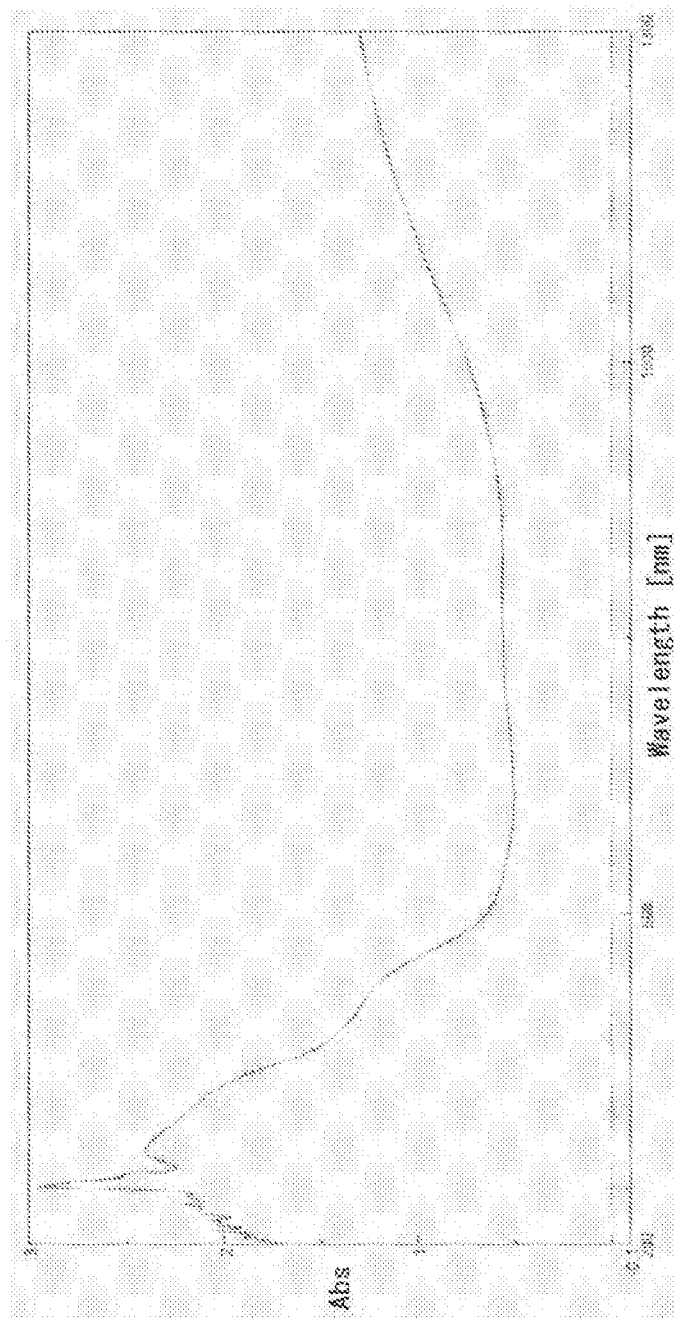
FIG. 18 shows a UV-Vis-NIR spectrum (solvent: pH9 borate buffer, 0.1 mg/mL concentration) after purification of Example 3C.

In addition, the resulting polymer substance was confirmed with FT-IR spectrum (FIG. 17) and UV-Vis-NIR spectrum (FIG. 18). From UV-Vis-NIR spectrum, absorption was confirmed also in a longer-wavelength region in comparison with 3-amino-4-methoxyphenylphosphonic acid hydrochloride salt (FIG. 6) which is the raw material, and it was confirmed that the raw material was polymerized and a polymer was obtained. Furthermore, a high value of absorption based on a polaron band was observed at 1000 nm or above, and it was confirmed that a polyaniline having high conductivity was obtained.

The measured values of the conductivity of the respective Example described above were compared with the values (values described in Table 1 on page 8520 of Non-Patent Document 1) of conductivity of polymers 5 to 7 (self-doping type poly(o-aminobenzylphosphonic acid) produced in Non-Patent Document 1 (Chan et al, Journal of the American Chemical Society, 117, 8517 (1995)). The results are described in Table 1.

TABLE 1

Conductivity of polyaminophenylphosphonic acids (electric conductivity; unit S/m)

|  |  | before purification | after purification |
|---|---|---|---|
| Present Invention | Example 1A | 0.53 | 1.33 |
|  | Example 1B | — | 3 |
|  | Example 2 | 0.27 | 1.33 |
|  | Example 3A | 0.27 | 1.33 |
|  | Example 3B | — | 53 |
|  | Example 3C | — | 15 |
| Non-Patent Document 1 | Polymer 5 | — | 0.15 |
|  | Polymer 6 | — | 0.06 |
|  | Polymer 7 | — | 0.008 |

The polyaniline of Examples 1A, 1B, 2, 3A, 3B and 3C indicates electric conductivity sufficient as an antistatic agent before purification or after purification, and it is understood that the polyaniline has higher electric conductivity and is thus better in conductivity than the poly(o-aminobenzylphosphonic acid) of Non-Patent Document 1.

Table 2 below collectively shows comparison results of the polyaniline synthesis of the Examples and Non-Patent Document 1.

TABLE 2

(Yield, number of steps, and purification means used related to raw material synthesis before polymerization)

|  | yield | number of steps | purification means which is used |
|---|---|---|---|
| Synthesis Example 1 | 44% | 2 | none |
| Synthesis Example 2 | 80% | 2 | column chromatography |
| Synthesis Example 3 | 50% | 3 | column chromatography |
| Non-Patent Document 1 | 30% | 3 | column chromatography, ion exchange, recrystallization |

(Confirmation of Antistatic Effect)

Effects of poly(2-methoxyaniline-5-phosphoric acid) obtained in Example 3C as an antistatic agent are evaluated below.

Synthesis Example 4

Preparation of Antistatic Agent Solution A 13.5 mL ultrapure water and 1477 µL 1M-pyridine aqueous solution (1.5 mmol) were added to 150 mg poly(2-methoxyaniline-5-phosphonic acid) (0.739 mmol) obtained in Example 3C and it was dissolved, to obtain an antistatic agent solution A.

Synthesis Example 5

Preparation of Antistatic Agent Solution B 12.78 mL ultrapure water, 1773 µL 1M-2,2,2-trifluoroethylamine aqueous solution (1.773 mmol), and 443 µL 1M-ammonia aqueous solution (0.443 mmol) were added to 150 mg poly(2-methoxyaniline-5-phosphonic acid) (0.739 mmol) obtained in Example 3C and it was dissolved to obtain an antistatic agent solution B.

Example 4

Formation of Resist Pattern

Figure 19:
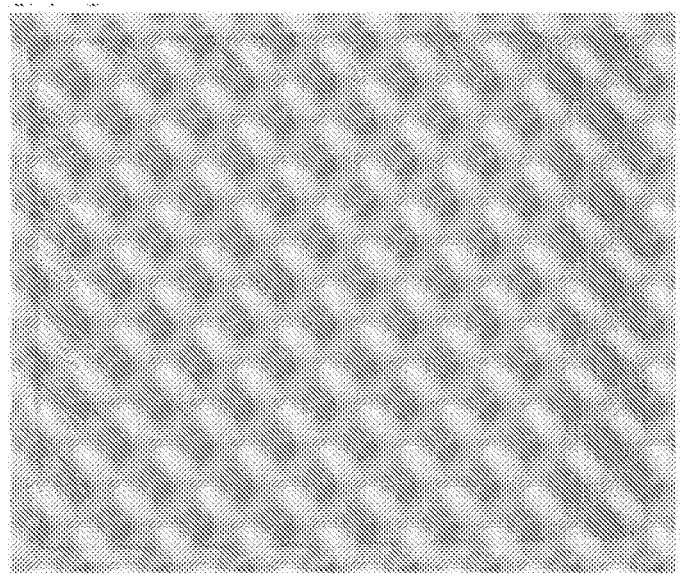
FIG. 19 is a photograph showing a resist pattern when an antistatic agent solution A of Example 4 is used.

Electron beam positive-type resist material (ZEP520-A, available from Zeon Corporation) was spin-coated at 3000 rpm for 30 seconds on a quartz substrate to form a thin film of resist material, thus making a sample. The sample was heated to 180° C. for 3 minutes to be pre-baked in order to volatilize and remove the solvent contained in the thin film of the resist material on the resulting substrate. Furthermore, the antistatic agent solution A was spin-coated on the sample at a rotation rate of 2000 rpm for 60 seconds to form an antistatic film. Nitrogen gas was sprayed on the sample to blow away excess antistatic agent on the antistatic film. Then, using an electron-beam printing apparatus (ELS-7700, accelerating voltage 75 kV; available from Elionix Inc.), a 100 µm×100 µm square pattern was exposed with an electron beam exposure amount of 300 µC/cm$^2$ at the center of the quartz substrate. Furthermore, a straight line with a line width of 1 µm and a length of 100 µm was exposed with an electron beam exposure amount of 140 µC/cm$^2$ at a position 1 µm away from one side of the square, and 9 similar straight lines were further exposed at intervals of pitch 2 µm in parallel to the above-described straight line, thus forming a line and space pattern in which 10 straight lines were arranged in parallel next to the square. After irradiation of electron beam, the sample was dipped in an alkali aqueous solution, 2.38% tetramethylammonium hydroxide aqueous solution (NMD-3; available from Tokyo Chka Kogyo Co., Ltd), for 30 seconds to dissolve the antistatic film. Then, the sample was rinsed with distilled water for 30 seconds, nitrogen gas was sprayed thereon to blow away water and to be dried. The sample was dipped in a developer (ZMD-N50, available from Zeon Corporation) to develop for 60 seconds. Then, the sample was rinsed with a washing liquid (ZMD-B, available from Zeon Corporation) for 60 seconds to obtain a resist pattern. The resulting resist pattern was observed through an optical microscope and a photograph was taken. The resulting photograph is shown in FIG. 19.

Example 5

Formation of Resist Pattern

Figure 20:
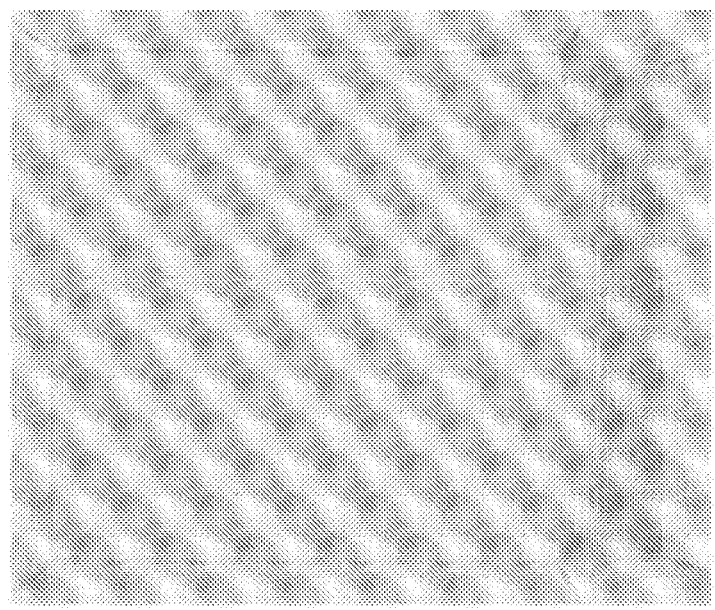
FIG. 20 is a photograph showing a resist pattern when an antistatic agent solution B of Example 5 is used.

Besides the fact that the antistatic agent solution A was changed to an antistatic agent solution B, the 2.38% tetramethylammonium hydroxide aqueous solution as a liquid for dissolving the antistatic film was changed to distilled water, and the 30 second rinsing with distilled water was not performed, operations similar to those of Example 4 were performed to obtain a resist pattern. The resulting resist pattern was observed through an optical microscope, and a photograph was taken. The resulting photograph is shown in FIG. 20.

Comparison Example 1

Figure 21:
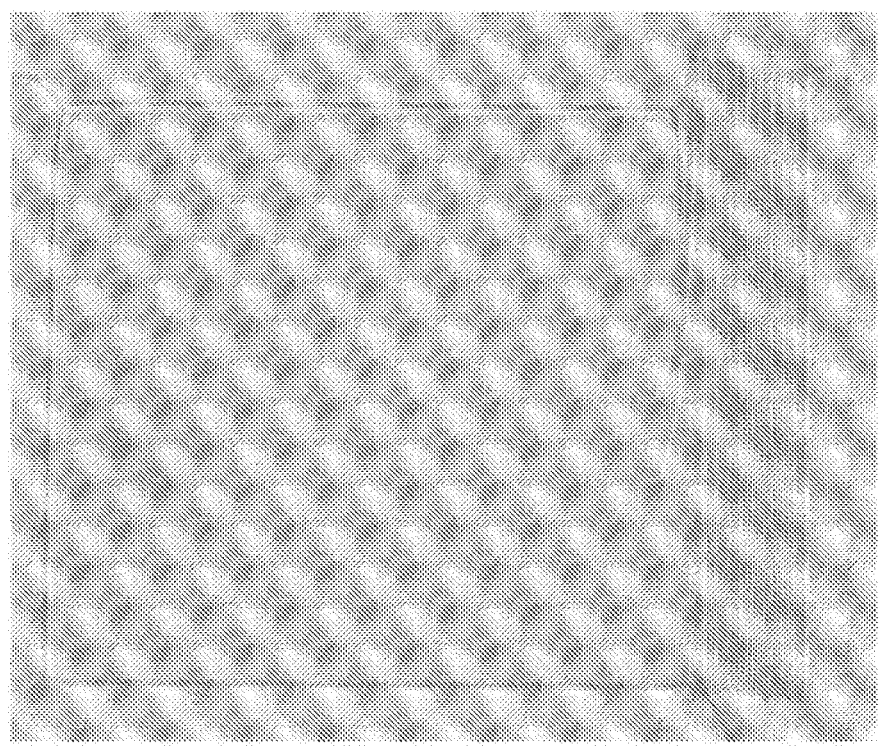
FIG. 21 is a photograph showing a resist pattern of a Comparative Example 1 when an antistatic agent is not used.

Electron beam positive-type resist material (ZEP520-A, available from Zeon Corporation) was spin-coated at 3000 rpm for 30 seconds on a quartz substrate to form a thin film of resist material, thus making a sample. The sample was heated to 180° C. for 3 minutes to be pre-baked in order to volatilize and remove the solvent contained in the thin film of the resist material on the resulting substrate. Then, using an electron beam lithography system (ELS-7700, accelerating voltage 75 kV; available from Elionix Inc.), a 100 μm×100 μm square pattern was exposed with an electron beam exposure amount of 300 μC/cm² at the center of the quartz substrate. Furthermore, a straight line with a line width of 1 μm and a length of 100 μm was exposed with an electron beam exposure amount of 140 μC/cm² at a position 1 μm away from one side of the square, and 9 similar straight lines were further exposed at intervals of pitch 2 μm in parallel to the first straight line, thus forming a line and space pattern in which 10 straight lines were arranged in parallel next to the square. After irradiation of electron beam, the sample was dipped in a developer (ZMD-N50, available from Zeon Corporation) to develop for 60 seconds. Then, the sample was rinsed with a washing liquid (ZMD-B, available from Zeon Corporation) for 60 seconds to obtain a resist pattern. The resulting resist pattern was observed through an optical microscope and a photograph was taken. The resulting photograph is shown in FIG. 21.

With regard to the resist pattern of Comparative Example 1 (FIG. 21) which did not use an antistatic agent, 10 straight lines were significantly deviated from the square. The deviation was particularly significant at the upper right corner of the square in FIG. 21, and a deviation of about 10 μm at maximum was observed. Specifically, a great deviation was observed from a design pattern due to charge-up. On the other hand, with regard to the resist pattern (FIG. 19) of Example 4 for which the antistatic agent solution A was used and the resist pattern (FIG. 20) of Example 5 for which the antistatic agent solution B was used, 10 straight lines were formed without any deviation from the square. As such, deviations from a design pattern due to charge-up were significantly reduced by using the antistatic agent solution A or antistatic agent solution B.

The producing method according to the present invention has a higher yield in the raw material synthesis before polymerization compared to Non-Patent Document Example 1, and the purification means is easier to operate as well. The producing method according to the present invention is understood to be a simpler and more practical method compared to the method of Non-Patent Document Example 1. In particular, in the methods of Synthesis Example 1 and Synthesis Example 2, they are more advantageous in that the number of steps is less by 1. In particular, the method of Synthesis Example 2 is extremely advantageous in that the yield is extremely high.

INDUSTRIAL APPLICABILITY

According to the present invention, a novel water-soluble polyaniline having a self-doping function can be obtained easier than conventional methods, with a higher yield and with less cost. In addition, the resulting polyaniline has a characteristic of being water soluble, and it is an electrically conductive polymer having electron conductivity via a π electron system and having ion conductivity, from which a highly electrically conductive polymer thin film can be formed easily using a cast method or other film forming methods. The polymer obtained by using the producing method according to the present invention can be applied to a variety of uses such as an antistatic agent, static preventing agent, electrode material of plastic electrode, EMI material, organic ferromagnet, and various sensors.

The invention claimed is:
1. A method for producing a polyaniline, comprising a step of polymerizing an aniline monomer compound represented by the following general formula (4):

(wherein $R^1$ is $NH_2$ or $NH_3X$, and X is a halogen atom; $R^2$ is each independently a substituent represented by the following general formula (5):

$M^1$ and $M^2$ are each independently selected from the group consisting of a hydrogen atom, alkali metal, alkaline earth metal, ammonium group, and pyridinium group, with the proviso that when $M^1$ or $M^2$ is an alkaline earth metal, the structure is such that the alkaline earth metal atom is bound to two $O^-$ in one phosphonic acid group and $M^2$ is not present, or such that the alkaline earth metal atom crosslinks $O^-$ of two phosphonic acid groups;

$R^3$ is each independently selected from the group consisting of a halogen atom, alkyl group in which the number of carbon atoms is 1 to 15, aralkyl group in which the number of carbon atoms is 7 to 34, alkoxy group in which the number of carbon atoms is 1 to 15, alkylthio group in which the number of carbon atoms is 1 to 15, alkylamino group in which the number of carbon atoms is 1 to 15, carboxyl group, carboxylic acid alkyl ester group in which the number of carbon atoms of the alkyl group is 1 to 15, nitro group and cyano group;

m is an integer of 1 to 4;

n is an integer of 0 to 3; and the sum of m and n is 1 to 4;
with the proviso that neither $R^2$ nor $R^3$ is present at the para position relative to $R^1$); or
an aniline monomer mixture comprising the aniline monomer compound.

2. The method according to claim 1, wherein at least one of $M^1$ and $M^2$ is a hydrogen atom.

3. The method according to claim 1, wherein the polymerizing step is performed in the presence of 0.5 to 10 equivalents of an oxidizing agent with respect to the aniline monomer compound or the aniline monomer mixture.

4. The method according to claim 1, wherein the polymerizing step is performed in the presence of a solvent.

5. The method according to claim 4, wherein the solvent is at least one selected from ammonia water, pyridine water, pyridine, triethylamine water, triethylamine, water, hydrochloric acid, methanol, ethanol, isopropanol, acetonitrile, dimethylformamide, acetone, 2-butanone and dimethylacetamide.

6. The method according to claim 1, further comprising a step of synthesizing an aniline monomer compound represented by general formula (4), wherein the synthesizing step comprises: binding a dialkyl phosphite represented by general formula (7):

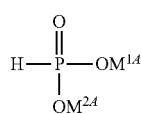
(7)

(wherein $M^{1A}$ and $M^{2A}$ are each independently an alkyl group in which the number of carbon atoms is 1 to 15) to a compound represented by the following general formula (6):

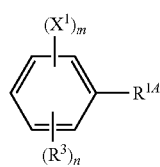
(6)

(wherein $R^{1A}$ is a nitro group or an amino group, and $X^1$ is each independently a halogen atom;
definitions of $R^3$, m and n are the same as the definitions of $R^3$, m and n in claim 1;
with the proviso that neither $X^1$ nor $R^3$ is present in the para position relative to $R^{1A}$).

7. The method according to claim 1, further comprising a step of synthesizing an aniline monomer compound represented by general formula (4), wherein the synthesizing step comprises nitrating a compound represented by the following general formula (8):

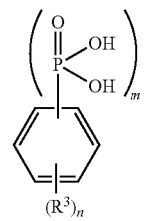
(8)

(wherein definitions of $R^3$, m and n are the same as the definitions of $R^3$, m and n in claim 1, with the proviso that no substituent is present on the carbon at the para position relative to the carbon to be nitrated in the benzene ring).

8. The method according to claim 6, wherein $R^{1A}$ is an amino group, and wherein the method further comprises hydrolyzing alkyl ester of $M^{1A}$ and $M^{2A}$ moieties of the compound obtained by binding the dialkyl phosphite to obtain an aniline monomer compound.

9. The method according to claim 6, wherein $R^{1A}$ is a nitro group, and wherein the method further comprises reducing a nitro group of the compound, which is obtained by binding the dialkyl phosphite, to an amino group to obtain an amino compound, and hydrolyzing alkyl ester of $M^{1A}$ and $M^{2A}$ moieties of the obtained amino compound to obtain an aniline monomer compound.

10. The method according to claim 7, further comprising a step of reducing the nitro group of the compound obtained by the nitration to obtain an aniline monomer compound.

11. The method according to claim 1, wherein a reaction temperature of the polymerizing step is in the range from −15° C. to 70° C.

12. The method according to claim 1, wherein m is 1, and n is 0 or 1.

13. The method according to claim 1, further comprising a step of performing an ion exchange treatment on the polymerization reaction product to replace a metal atom, an ammonium group or a pyridinium group of the phosphonic acid metal salt, phosphonic acid ammonium salt or phosphonic acid pyridinium salt in the polymerization reaction product with a hydrogen atom.

14. The method according to claim 13, wherein: the ion exchange treatment step is a step of adding an acidic aqueous solution to the polymerization reaction product to replace a salt moiety of the phosphonic acid salt compound with hydrogen; after the ion exchange treatment step, a step of separating a polyaniline compound from the aqueous solution is performed; and further, thereafter, a step of adding an acidic aqueous solution to replace a salt moiety of the phosphonic acid salt compound with hydrogen and a step of separating a polyaniline compound from the aqueous solution are repeatedly performed.

15. A polyaniline produced by using the method according to claim 1.

16. An antistatic agent containing the polyaniline according to claim 15.

* * * * *